(12) United States Patent
Contarino, Jr.

(10) Patent No.: US 9,681,775 B2
(45) Date of Patent: Jun. 20, 2017

(54) APPARATUS FOR COOKING PIZZA IN KETTLE- OR KAMADO-STYLE COOKING GRILLS

(71) Applicant: Alfred F. Contarino, Jr., Boxford, MA (US)

(72) Inventor: Alfred F. Contarino, Jr., Boxford, MA (US)

(73) Assignee: AFC Business Ventures, LLC, Boxford, MA (US)

( * ) Notice: Subject to any disclaimer, the term of this patent is extended or adjusted under 35 U.S.C. 154(b) by 540 days.

(21) Appl. No.: 14/050,706

(22) Filed: Oct. 10, 2013

(65) Prior Publication Data

US 2014/0130788 A1 May 15, 2014

Related U.S. Application Data

(60) Provisional application No. 61/726,700, filed on Nov. 15, 2012.

(51) Int. Cl.
*A47J 37/07* (2006.01)
*A47J 37/06* (2006.01)

(52) U.S. Cl.
CPC ......... *A47J 37/0704* (2013.01); *A47J 37/067* (2013.01); *A47J 37/0786* (2013.01); *A47J 2037/0795* (2013.01)

(58) Field of Classification Search
CPC .................. A47J 2037/0795; F24B 1/003
(Continued)

(56) References Cited

U.S. PATENT DOCUMENTS

| 833,529 A | 10/1906 | Jones |
|---|---|---|
| 1,751,219 A | 3/1930 | Seamon |

(Continued)

FOREIGN PATENT DOCUMENTS

| CN | 202386539 | 8/2012 |
|---|---|---|
| CN | 202537255 | 11/2012 |

(Continued)

OTHER PUBLICATIONS

Webpage for "Amazon.com : Weber 7403 Char-Basket Charcoal Briquet Holders : Grill Parts: Patio, Lawn & Garden" from Amazon.com, http://www.amazon.com/Weber-7403-Char-Basket-Charcoal-Briquet/dp/B000WEMGM4/ref=sr_1_1?ie=UTF8&qid=1402322800&sr=8-1&keywords=weber+7403+charbasket+charcoal+briquet+holders, retrieved on Nov. 2, 2012.

(Continued)

*Primary Examiner* — David J Laux
(74) *Attorney, Agent, or Firm* — Saul Ewing LLP

(57) ABSTRACT

An apparatus usable in a kettle- or kamado-style grill instead of a conventional cooking grate. The apparatus includes a cooking surface support configured for support in a base of the grill in lieu of the conventional grate, and a complementary cooking surface supportable on the cooking surface support. The cooking surface support defines open fuel ports providing access to the fuel chamber. The apparatus may include a secondary fuel basket positionable within an open fuel port. An alternative apparatus comprises a unitary body adapted to be supported in the bottom portion of the cooking grill. The unitary body comprises a structural support portion configured to abut a bottom portion of the grill, and a cooking support portion spanning more than 50% of the area of the unitary body. The unitary body defines at least one (Continued)

open fuel port permit admission of additional fuel to the bottom of the grill.

28 Claims, 18 Drawing Sheets

(58) Field of Classification Search
USPC ...... 126/25 R, 25 A, 25 AA, 25 B, 25 C, 26, 126/27, 29, 30
See application file for complete search history.

(56) References Cited

U.S. PATENT DOCUMENTS

| | | |
|---|---|---|
| 2,015,295 A | 9/1935 | Steingruber |
| 2,127,146 A | 8/1938 | Smallen |
| 2,155,654 A | 4/1939 | Haley |
| 2,430,582 A | 11/1947 | Reich |
| 2,709,996 A | 6/1955 | Tescula |
| 2,842,116 A | 7/1958 | Hinderer |
| 2,898,846 A | 8/1959 | Del Francia |
| 2,940,381 A | 6/1960 | Cottongim |
| 3,152,242 A | 10/1964 | De Mott |
| 3,169,517 A | 2/1965 | Maier |
| 3,199,438 A | 8/1965 | Myler |
| 3,299,800 A | 1/1967 | Angelo |
| 3,443,510 A | 5/1969 | Norton |
| 3,490,433 A | 1/1970 | Busenbarrick |
| 3,611,912 A | 10/1971 | Choc |
| 3,657,996 A | 4/1972 | Thompson |
| 3,783,855 A | 1/1974 | Newinger |
| 3,802,413 A | 4/1974 | Pepin |
| 3,938,494 A | 2/1976 | Clark |
| 3,947,657 A | 3/1976 | Ershler |
| 4,210,072 A | 7/1980 | Pedrini |
| 4,220,133 A | 9/1980 | Way, Jr. |
| 4,332,188 A | 6/1982 | Rhear |
| 4,362,093 A | 12/1982 | Griscom |
| 4,378,729 A | 4/1983 | Pierick |
| 4,384,513 A | 5/1983 | Pierick |
| 4,392,419 A | 7/1983 | Bonny |
| 4,437,396 A | 3/1984 | Plattner |
| 4,467,709 A | 8/1984 | Anstedt |
| 4,512,249 A | 4/1985 | Mentzel |
| 4,516,485 A | 5/1985 | Miller |
| 4,531,505 A | 7/1985 | Hait |
| 4,598,634 A | 7/1986 | Van Horn, II |
| 4,718,400 A | 1/1988 | Lotz |
| 4,721,037 A | 1/1988 | Blosnich |
| 4,777,927 A | 10/1988 | Stephen |
| 4,800,865 A | 1/1989 | Setzer |
| 4,840,118 A | 6/1989 | Rinehart |
| 4,962,696 A | 10/1990 | Gillis |
| 5,088,470 A | 2/1992 | James, Jr. |
| 5,186,159 A | 2/1993 | Crow, Jr. |
| 5,213,027 A | 5/1993 | Tsotsos |
| 5,222,475 A | 6/1993 | Greener |
| 5,237,914 A | 8/1993 | Carstensen |
| 5,259,299 A | 11/1993 | Ferraro |
| D344,871 S | 3/1994 | Keller |
| 5,315,922 A | 5/1994 | Keller |
| 5,333,540 A | 8/1994 | Mazzocchi |
| 5,347,978 A | 9/1994 | Zuran |
| 5,355,868 A | 10/1994 | Haen |
| 5,365,833 A | 11/1994 | Chen |
| 5,368,009 A | 11/1994 | Jones |
| 5,404,795 A | 4/1995 | Coble |
| 5,490,452 A | 2/1996 | Schlosser et al. |
| 5,553,601 A | 9/1996 | Parker |
| 5,586,488 A | 12/1996 | Liu |
| 5,678,531 A | 10/1997 | Byers |
| 5,768,977 A | 6/1998 | Parris |
| 5,850,780 A | 12/1998 | Mascia |
| 5,884,555 A | 3/1999 | Chang |
| 5,909,729 A | 6/1999 | Nowicke |
| 5,911,812 A | 6/1999 | Stanek |
| 5,960,782 A | 10/1999 | Clements |
| 6,000,389 A | 12/1999 | Alpert |
| 6,024,081 A | 2/2000 | Libertini, Jr. |
| 6,029,649 A | 2/2000 | Su |
| 6,039,039 A | 3/2000 | Pina, Jr. |
| 6,064,042 A | 5/2000 | Glucksman |
| 6,114,665 A | 9/2000 | Garcia |
| 6,153,857 A | 11/2000 | Gunnels |
| 6,158,330 A | 12/2000 | Andress |
| 6,187,359 B1 | 2/2001 | Zuccarini |
| 6,260,478 B1 | 7/2001 | Harneit |
| 6,308,616 B1 | 10/2001 | Johnson |
| 6,508,165 B2 | 1/2003 | Johnson |
| 6,546,845 B1 | 4/2003 | Lanzilli |
| 6,640,695 B2 | 11/2003 | Stark |
| 6,705,307 B2 | 3/2004 | Alden |
| 6,892,722 B1 | 5/2005 | Francies, III |
| 6,931,985 B1 | 8/2005 | Attie |
| 7,163,011 B2 | 1/2007 | Pestrue |
| 7,686,010 B2 | 3/2010 | Gustavsen |
| 7,905,225 B2 | 3/2011 | Contarino |
| D645,295 S | 9/2011 | Klesath |
| 8,261,732 B2 | 9/2012 | Contarino, Jr. |
| 8,267,078 B2 | 9/2012 | Kuntz |
| 8,578,927 B2 | 11/2013 | Gustavsen |
| 9,198,538 B2 * | 12/2015 | Safar .................. A47J 37/0754 |
| 2002/0017290 A1 | 2/2002 | Hines |
| 2002/0020303 A1 | 2/2002 | Johnson |
| 2003/0145740 A1 | 8/2003 | Stark |
| 2003/0213484 A1 | 11/2003 | Alden |
| 2004/0112226 A1 | 6/2004 | Johnston |
| 2005/0039612 A1 * | 2/2005 | Denny ................ A47J 37/0623 |
| | | 99/450 |
| 2006/0000365 A1 | 1/2006 | Attie |
| 2006/0102015 A1 | 5/2006 | Baker |
| 2006/0102167 A1 | 5/2006 | Driscoll |
| 2006/0112948 A1 | 6/2006 | Ducate |
| 2006/0191528 A1 | 8/2006 | Spangrud |
| 2007/0163568 A1 | 7/2007 | Murray |
| 2007/0175467 A1 | 8/2007 | Liu |
| 2007/0277800 A1 | 12/2007 | Chiang |
| 2009/0064872 A1 * | 3/2009 | Zisserson ............ A47J 37/0694 |
| | | 99/450 |
| 2009/0078246 A1 | 3/2009 | Leavens |
| 2009/0090348 A1 | 4/2009 | Contarino |
| 2009/0101024 A1 | 4/2009 | Button |
| 2010/0124596 A1 | 5/2010 | Nelson |
| 2010/0132689 A1 | 6/2010 | Contarino |
| 2010/0147281 A1 * | 6/2010 | Gustavsen .............. F24B 1/003 |
| | | 126/21 A |
| 2010/0147285 A1 | 6/2010 | Seong |
| 2011/0214662 A1 | 9/2011 | Contarino, Jr. |
| 2012/0024171 A1 | 2/2012 | Estes |
| 2014/0251160 A1 | 9/2014 | Contarino |
| 2015/0027432 A1 | 1/2015 | Contarino |
| 2015/0164278 A1 | 6/2015 | Kohler |

FOREIGN PATENT DOCUMENTS

| | | |
|---|---|---|
| DE | 3926182 | 2/1991 |
| DE | 9311876 | 11/1993 |
| DE | 202005003982 | 6/2005 |
| FR | 2635258 | 2/1990 |
| GB | 2143119 | 2/1985 |
| GB | 2489421 A | 10/2012 |
| JP | 2006102488 | 4/2006 |
| WO | 2011027096 | 3/2011 |
| WO | 2012159131 | 11/2012 |

OTHER PUBLICATIONS

Webpage for "Grilling Accessory | Grill Accessories | Pizza Stone | Pizza Ovens" from Red Sky Grilling Products, http://redskygrilling.com/, retrieved on Oct. 23, 2012.
Chinese Office Action mailed Apr. 3, 2016 for Chinese Application No. 201410200874.1, including English translation.

(56) References Cited

OTHER PUBLICATIONS

Malloy, Ryan, "Plasticity," 2012, Vimeo video retrieved online from <https://vimeo.com/couchmode/user1057436/videos/sort:date/12827359> on Sep. 6, 2016.
PizzaHacker's BackYard, LLC, "The Pizza Hacker.com," 2013, retrieved online from <http://thepizzahacker.com/> retrieved on Sep. 6, 2016.
Ah Nom Nom: Pizza Hacker—Best Pizza Food Cart—San Francisco, Sep. 22, 2009, YouTube, <https://www.youtube.com/watch?v=RLC-SIGpZkE >.
"Pizza Hacker—San Fransico, CA", Feb. 23, 2010, YouTube, https://youtu.be/-x9lErbHJgg.
Chinese Office Action mailed Nov. 9, 2016, for Chinese Application No. 201410200874.1, including English translation.

\* cited by examiner

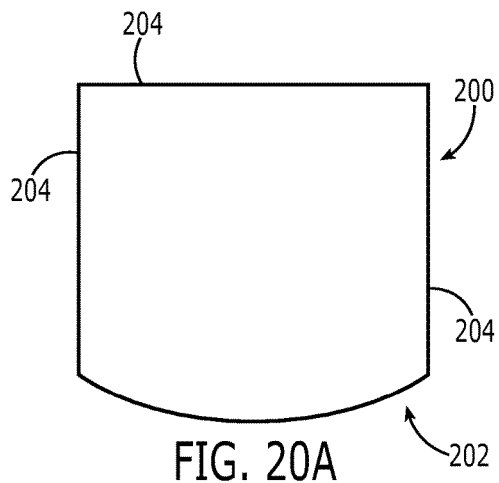
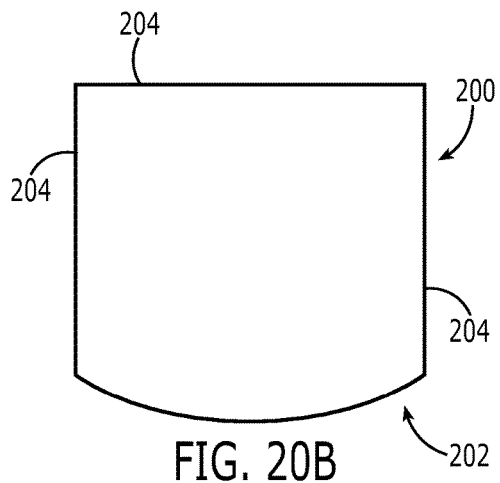
FIG. 20A    FIG. 20B
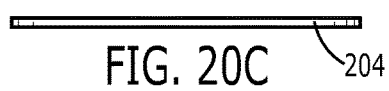
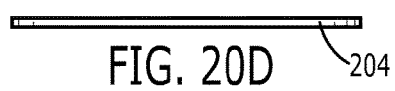
FIG. 20C    FIG. 20D
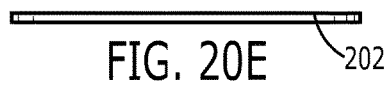
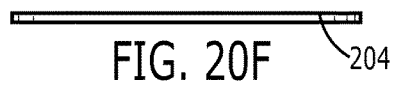
FIG. 20E    FIG. 20F
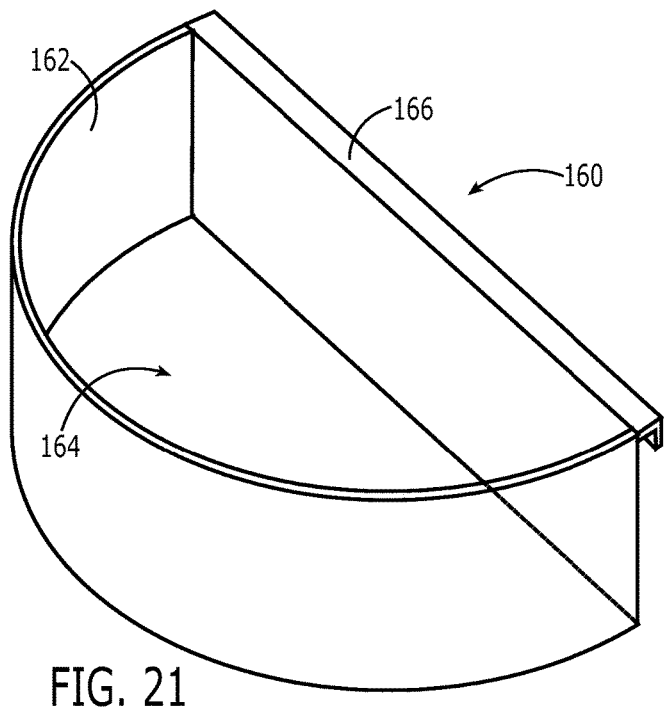
FIG. 21

APPARATUS FOR COOKING PIZZA IN KETTLE- OR KAMADO-STYLE COOKING GRILLS

CROSS-REFERENCE TO RELATED APPLICATION

This application claims the benefit of priority under 35 U.S.C. §119(e) of U.S. Provisional Patent Application No. 61/726,700, filed Nov. 15, 2012, the entirety of which is hereby incorporated herein by reference.

FIELD OF THE INVENTION

The present invention related generally to a cooking apparatus. More particularly, the present invention relates to an apparatus for adapting conventional cooking grills, especially kettle- or kamado-style grills, to cook pizzas and other foods in an improved manner.

BACKGROUND

People often wish to cook on their outdoor cooking grills foods, such as pizza, that are not necessarily traditionally considered grill foods. For instance, with respect to pizza, the desired cooking temperature for many pizza recipes is very high, on the order of about 600 to 750° Fahrenheit. It also is important that the temperature within the cooking chamber be particularly consistent, both spatially (the temperature is substantially the same everywhere within the cooking chamber) and temporally (the temperature does not fluctuate significantly with time). First, the temperature should be spatially consistent so all of the ingredients cook properly. A common problem with cooking pizza, particularly in grills, is that the crust cooks too fast relative to the ingredients on top of the crust such that the crust becomes too dry or even burns before all of the ingredients on top of the pizza are fully cooked or properly melted. Thus, temperature uniformity as a function of height above the heating element (e.g., charcoal, wood, or flame burners) is desired. Furthermore, if the temperature is not uniform in the horizontal direction, some sections of the crust may burn before other sections of the crust are fully baked.

Even further, maintaining a consistent temperature over time also is often important to cooking pizza (as well as many other foods). First, a consistent, proper temperature will, of course, cause the food to cook faster than a fluctuating temperature and temperature fluctuations can lead to the food not cooking properly all the way through to the center.

Often, it is particularly difficult to maintain consistent temperature in cooking grills for several reasons. First, in a conventional grill, the top of the grill must be removed to place food in the grill, remove food from the grill, and observe the cooking food. Since heated air rises relative to surrounding cooler air, each time the grill cover is removed, essentially all of the heated air in the cooking chamber rises and escapes, requiring the chamber to heat up again after the cover is replaced. Not only could this cause it to take longer to cook the food, but it could lead to uneven cooking since the air in the space beneath the food is likely to remain much hotter or at least heat up much more quickly than the air in the space above the pizza after each opening of the cover. This is particularly problematic with respect to cooking pizzas because the pizza dough and/or the solid surface on which the pizza must sit (such as a pizza stone) forms a large uninterrupted barrier between the air space below the pizza and the air space above the pizza. Also, since pizza recipes often require extremely high temperatures, temperature differentials can be significant.

Kettle-grills and kamado-style grills are two common grill types. An exemplary kettle-style grill 10 is shown in FIG. 1. An exemplary kamado-style grill 20 is shown in FIG. 2. The cooking chambers 11, 21, respectively, of both of these styles of grills (i.e., the enclosed portion containing the heating fuel and the cooking surface) are generally ovoid in shape with a circular or oval horizontal cross-section. They comprise a bottom or base portion 12, 22, respectively, and a top or cover portion 13, 23, respectively. They usually are heated by charcoal or wood placed in the bottom of the cooking chamber, although kettle- and kamado-grills heated by electricity or liquid fuel, such as propane, are known. Kettle-style grills are often made of metal, such as steel. Kamado-style grills usually are made of ceramic or other earthen materials that retain heat well. Most kettle-style grills have a removable top 13, whereas kamado-style grills usually have a hinged top 23 because the ceramic top is very heavy and would be difficult to handle if it were not attached. Since kettle- and kamado-style grills usually are round (as are pizzas) and usually are fueled by charcoal or wood so that they more easily achieve the higher cooking temperatures than electric or propane grills, they are often used for cooking pizzas.

As is well-known in the field of such charcoal- and wood-fired grills, a cooking grate 30 is supported above fuel in a lower fuel chamber 18, as will be appreciated from FIGS. 1-3. By way of example, the lower fuel chamber 18 may be defined between a lower fuel-supporting grate 19 (see FIG. 4) and the cooking grate 30. The cooking grate 30 is supported by support-structures 16 (e.g., inwardly extending brackets) of the base portion 14, 24 of the grill, as best shown in FIG. 4.

An embodiment of an exemplary fixed grate 30a includes a plurality of rigid rods 32 supported in closely-spaced parallel relationship to define a generally planar cooking area, as shown in FIGS. 3 and 5. In such an embodiment, all of the rods 32 are fixed, e.g., by welding, to a support structure 34 such that the grate 30a is a fixed, unitary body, as best shown in FIG. 5. The rods 32 are closely-spaced to adequately support foods during cooking, but to allow heat to rise up from the lower fuel chamber 18 to cook the supported food. Such close spacing of the rods 32 provides little or no access to the fuel chamber 18 for re-stoking/re-fueling, due to the relatively larger size of the charcoal briquettes, etc. Accordingly, such grates provide essentially no ability to re-stoke/re-fuel the grill during cooking, which can lead to decreased cooking temperature over time, and the fuel is gradually consumer. Further, any re-stoking involving such a grate would require not only removal of the grill's cover, but also the food and the grate 30 from the base portion 14 of the grill, which would lead to even further undesirable heat dissipation, and could be dangerous.

An embodiment of an alternative hinged grate 30b similarly includes a plurality of rigid rods 32 supported in closely-spaced parallel relationship to define a generally planar cooking area, as best shown in FIGS. 4 and 6 (the grate 30b being shown inverted in FIG. 7 for illustrative purposes). In such an embodiment, most of the rods 32 are fixed, e.g., by welding, to a support structure 34, but others 36 of the rods are movably joined to the support structure 34 to form hinged sections 38, as best shown in FIG. 5. The hinged sections 38 are movable to provide some access to the fuel chamber 18 for re-stoking, but access is limited to just two opposite sides of the grill. Accordingly, such grates provide little ability to re-stoke/re-fuel the grill during cooking to ensure a constant cooking temperature. Further, because so little fuel can be added only at two opposing sides, such an arrangement promotes a non-uniform temperature over the horizontal cooking-grate area, which is undesirable. Further, such conventional hinged grates have been found to be incompatible with typical conventional pizza stones in that the pizza stones are sufficiently large relative to typical grills/grates that the hinged sections 38 are inoperable with the pizza stone in place.

Further, neither conventional grate promotes temperature uniformity as a function of height above the fuel chamber, as the entire fuel source is positioned beneath the pizza stone, and the associated heat is concentrated beneath the pizza stone or other solid cooking surface, and tends to heat primarily the grate 30 and any supported pizza stone, without much heating of the air/cooking chamber above the grate/pizza stone. The resulting variation in temperature is undesirable for the reasons discussed above.

SUMMARY

The present invention pertains to an apparatus for adapting cooking grills, especially kettle- and kamado-style grills, for improved cooking of pizzas and other foods. The apparatus that may be used in a kettle- or kamado-style grill instead of a conventional cooking grate. The apparatus includes at least a cooking surface support configured for support in the base portion of the grill in lieu of the conventional grate, and a complementary cooking surface supportable on the cooking surface support. The cooking surface support defines a plurality of open fuel ports providing access to the fuel chamber. The open fuel ports are positioned around an open socket. The cooking surface support supports and constrains the cooking surface in both the horizontal and vertical directions. The cooking surface is received in the open socket of the cooking surface support and does not obstruct the open fuel ports.

The apparatus may include a secondary fuel basket positionable within an open fuel port and mountable on the cooking surface support. The secondary fuel basket is configured to support a secondary fuel supply at a level above the grill's fuel chamber beneath the cooking surface. Heat rising from the secondary fuel basket tends to heat primarily the airspace above the cooking surface, and thus promotes temperature uniformity as a function of height above the fuel chamber.

An alternative apparatus for adapting cooking grills, especially kettle- and kamado-style grills, for improved cooking of pizzas and other foods comprises a unitary body adapted to be supported in the bottom portion of the cooking grill. The unitary body comprises a structural support portion configured to abut a bottom portion of the grill, and a cooking support portion spanning more than 50% of the area of the unitary body.; The unitary body defines at least one open fuel port to permit admission of additional fuel to the bottom portion of the grill.

BRIEF DESCRIPTION OF THE FIGURES

An understanding of the following description will be facilitated by reference to the attached drawings, in which:

FIGS. 20A-20F are top, bottom, left side, right side, front and rear views, respectively, of the truncated cooking surface of FIG. 12;

FIG. 21 is a perspective view of a smoking basket;

DETAILED DESCRIPTION

The present invention provides an apparatus that may be used in a kettle- or kamado-style grill instead of a conventional cooking grate. The apparatus includes at least a cooking surface support 100 configured for support in the base portion of the grill instead of a conventional cooking grate, and a complementary cooking surface 200 supportable on the cooking surface support 100, as will be appreciated from FIG. 13.

Figure 1:
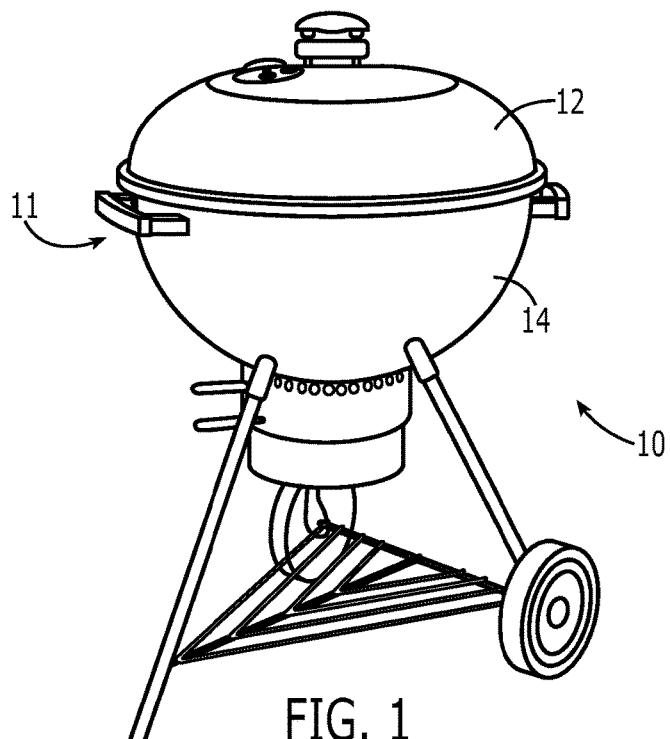
FIG. 1 shows a conventional kettle-style grill exemplary of the prior art.
Figure 2:
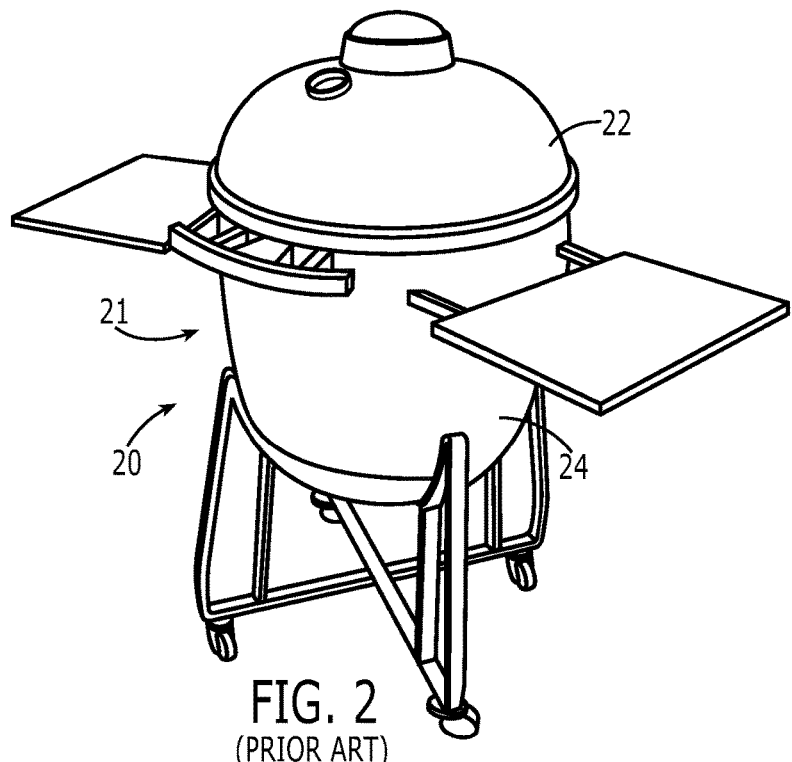
FIG. 2 shows a conventional kamado-style grill exemplary of the prior art.
Figure 3:
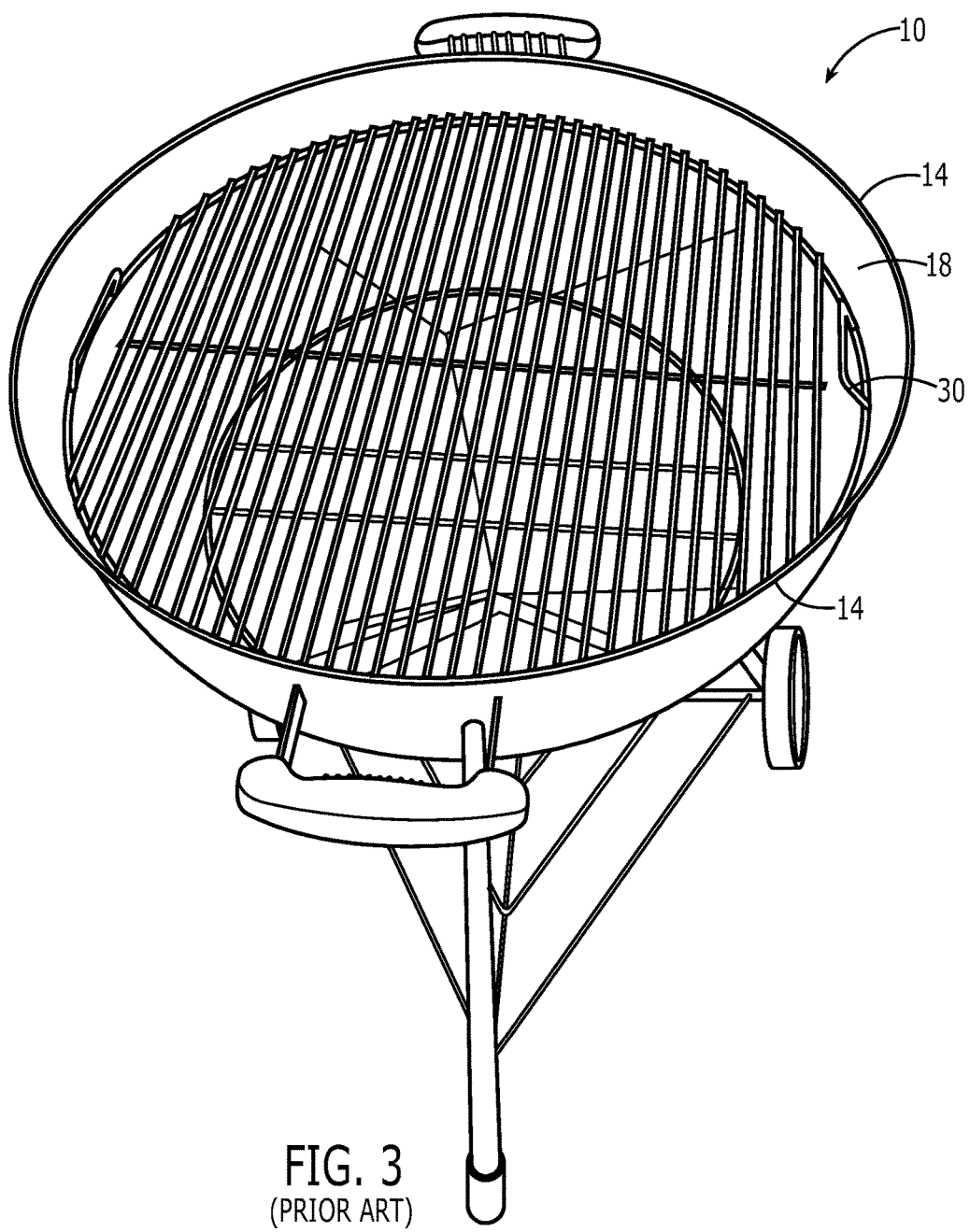
FIG. 3 is a top view of the kettle-style grill of FIG. 1 with the cover shown removed for illustrative purposes.
Figure 4:
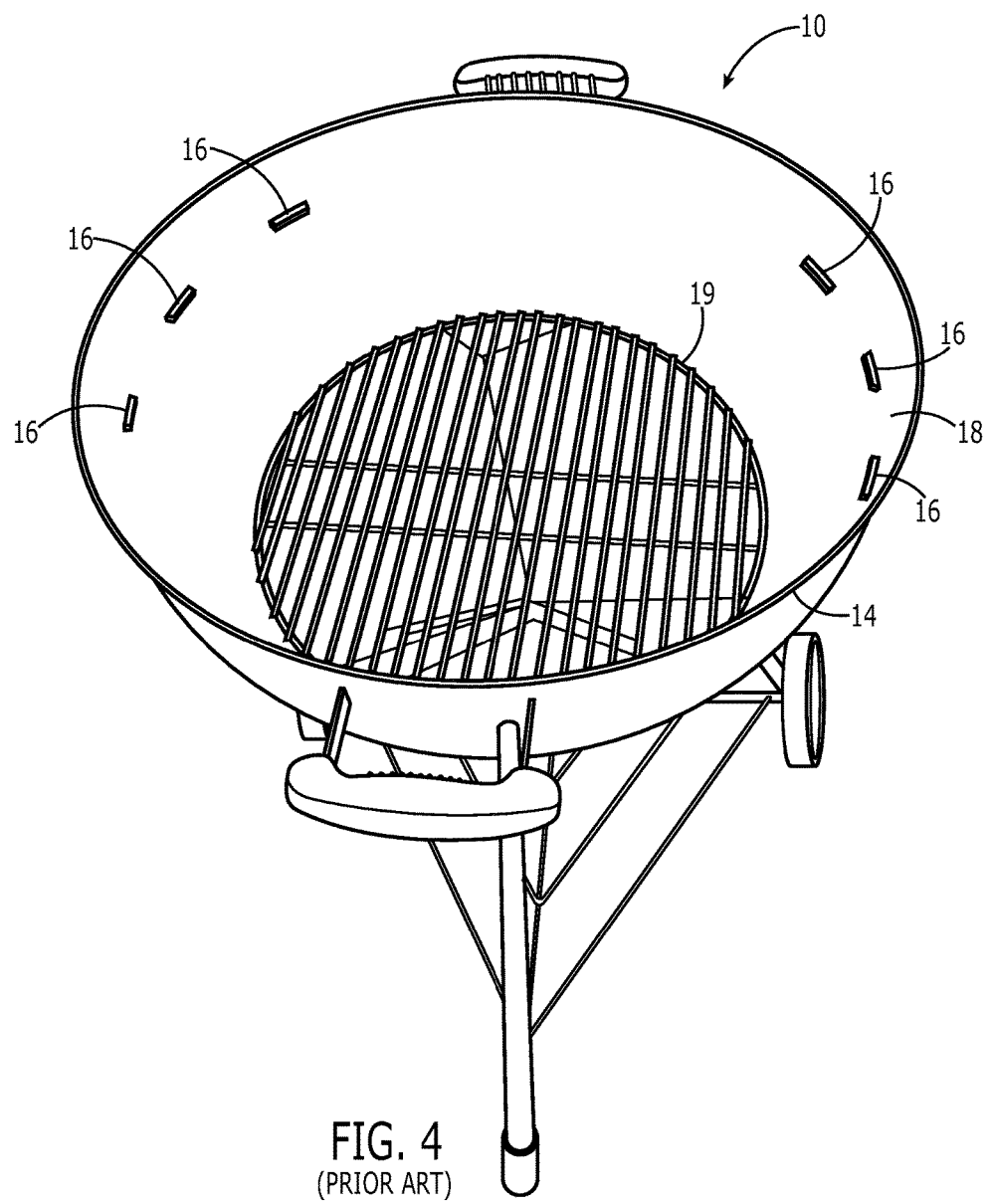
FIG. 4 is a top view of the kettle-style grill of FIG. 1 with the cover and cooking grate shown removed for illustrative purposes.
Figure 5:
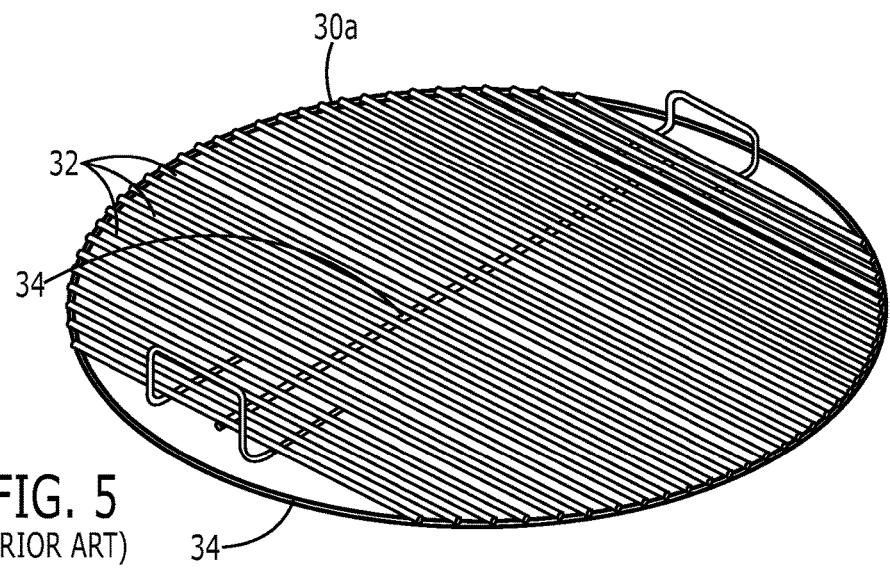
FIG. 5 is a perspective view of an exemplary fixed cooking grate representative of the prior art.
Figure 6:
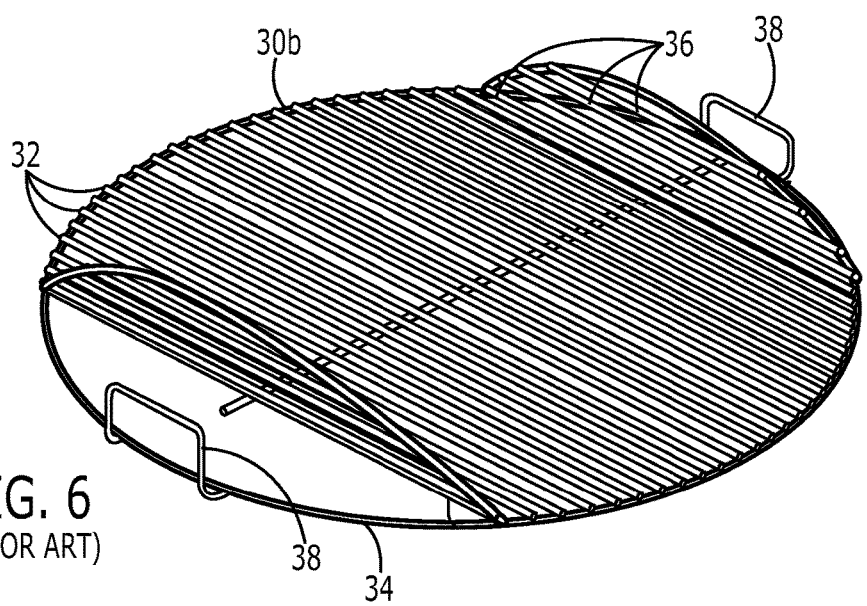
FIG. 6 is a perspective view of an exemplary hinged cooking grate representative of the prior art.
Figure 7:
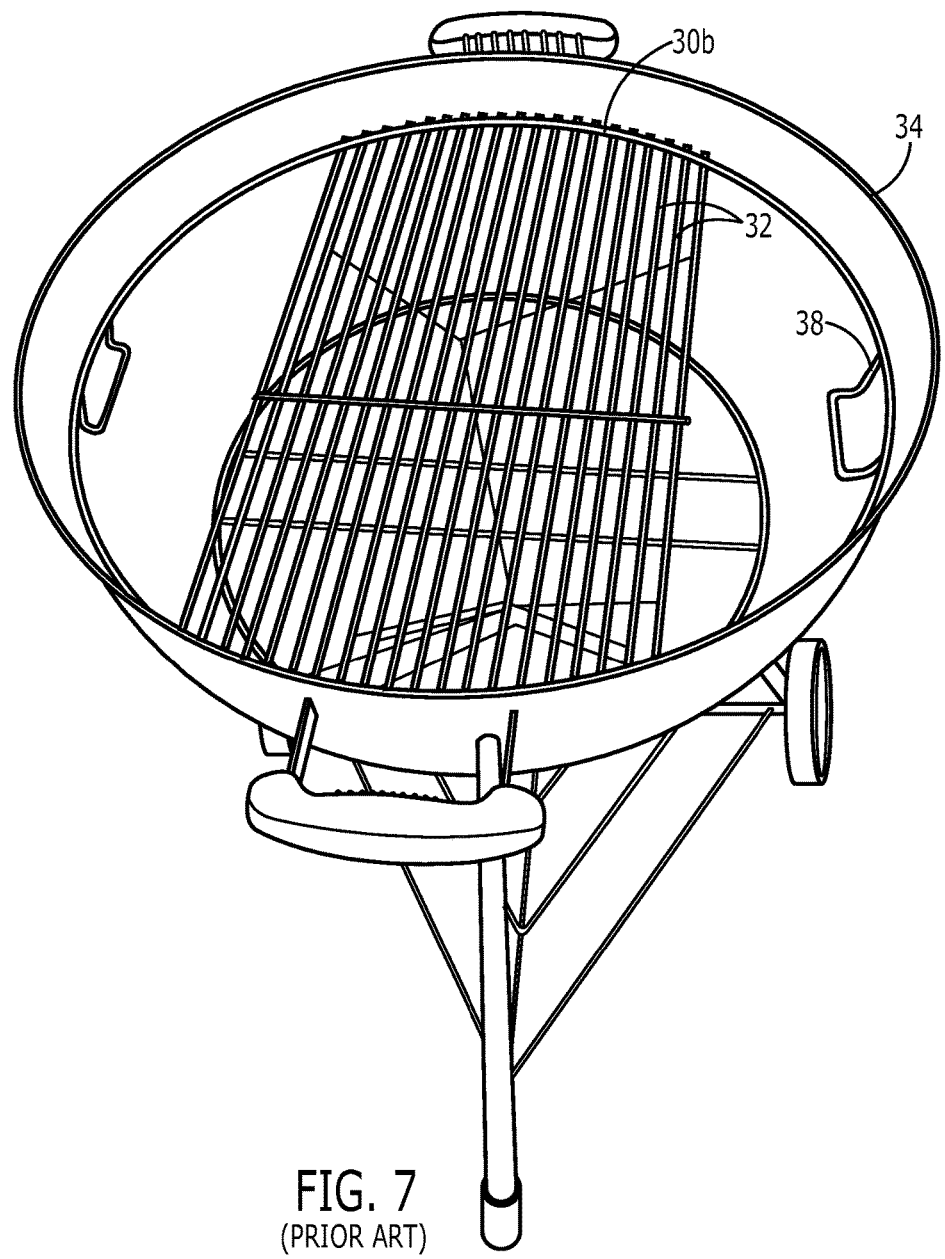
FIG. 7 is a top view of the kettle-style grill of FIG. 1 shown supporting the hinged cooking grate of FIG. 6 for illustrative purposes.
Figure 8:
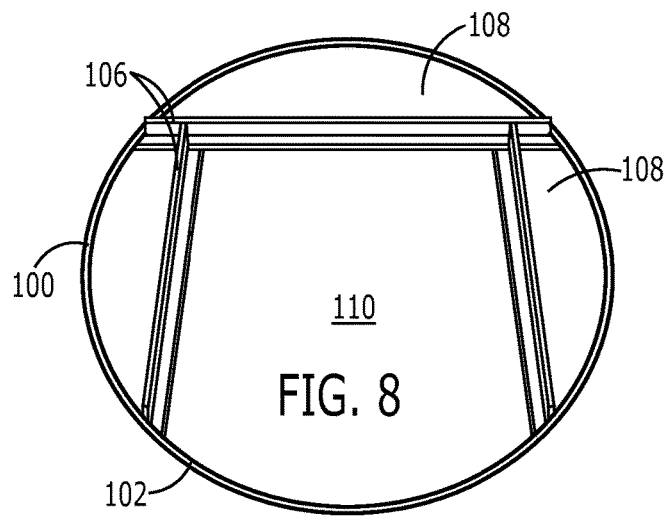
FIG. 8 is a top view of a cooking surface support in accordance with an exemplary embodiment of the present invention.
Figure 10:
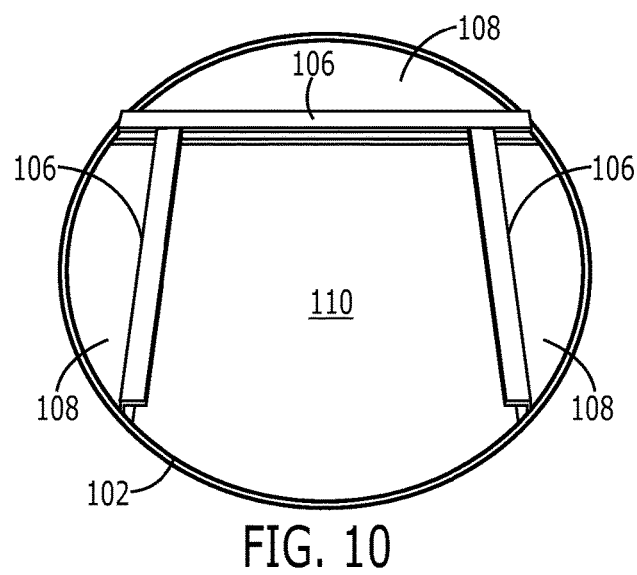
FIG. 10 is a bottom view of the cooking surface support of FIG. 8.
Figure 11:
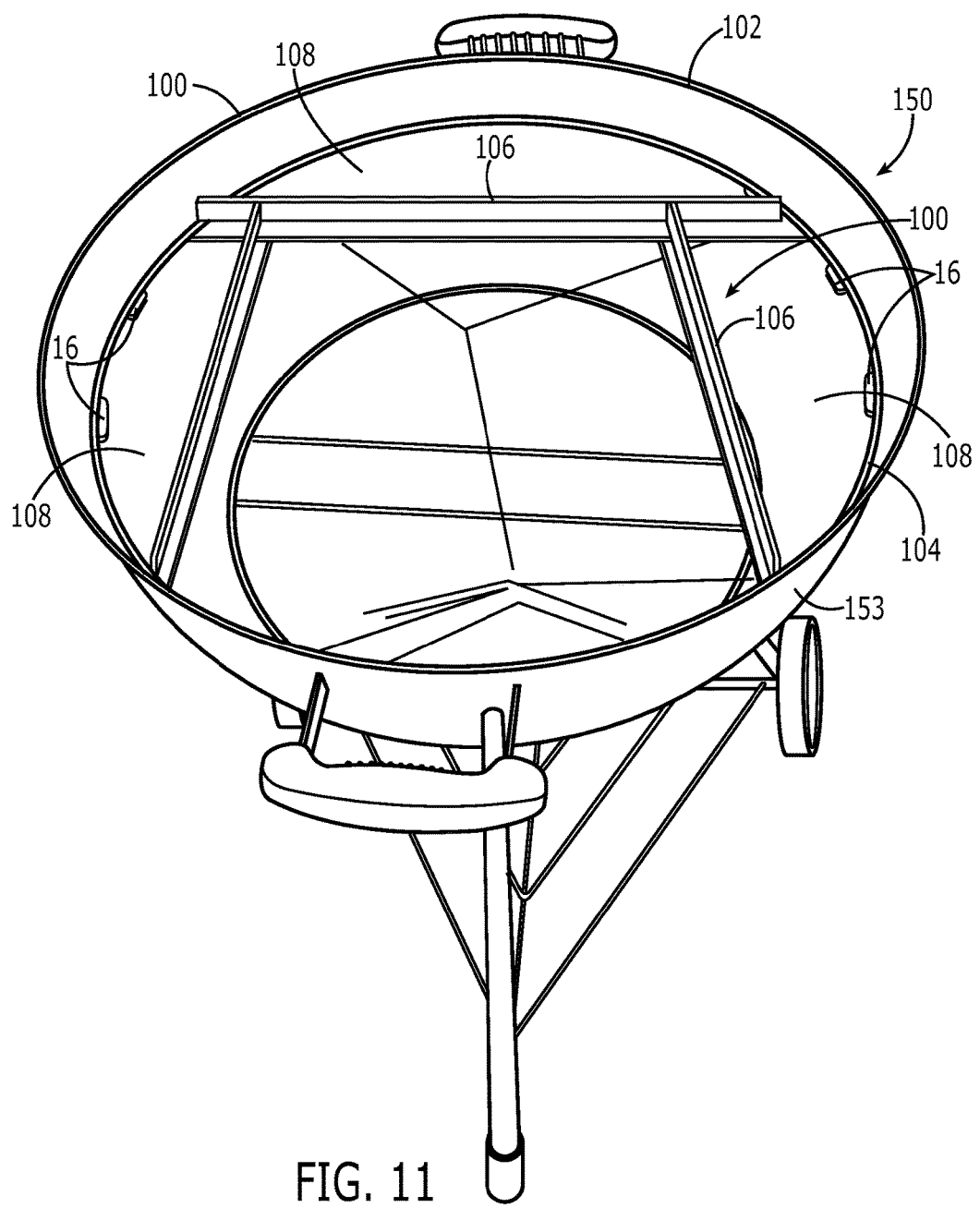
FIG. 11 is a top view of the base portion of a kettle grill, shown supporting the cooking surface support instead of a conventional cooking grate.

FIGS. 8 and 10 are top and bottom views of an exemplary embodiment of a cooking surface support 100, in accordance with the principles of the present invention. The exemplary cooking surface support 100 is suitable for use in connection with a kamado- or kettle-style grill 150, as shown in FIG. 11. The cooking surface support 100 can be made of any material that is sufficiently heat-resistant to withstand the maximum temperatures conventionally generated in a pizza oven or grill (it should probably be able to withstand at least 750 degrees Fahrenheit) and sufficiently strong to support the cooking surface and any food items likely to be placed thereon. Steel or another metal is preferred for the cooking surface support, though other materials may be used.

In a preferred embodiment, the cooking surface support 100 is sized to fit within the base portion 153 of the grill and sit directly on the original-equipment supports 16 for the original-equipment grate, as best shown in FIG. 11. Accordingly, the cooking surface support includes a structural support 102 configured to abut the supports 16 for the original-equipment grate. The structural support 102 provides mechanical support for the remainder of the cooking surface support 100 and cooking surface 200 as discussed below. In this exemplary embodiment, the structural support is formed as a circular hoop so as to be complementary with the shape of the kettle grill, and is constructed of a rod that is circular in cross-section. Referring now to FIGS. 8 and 11, the cooking surface support 100 further includes a suspension structure 104 configured to mechanically support the cooking surface 200. In this exemplary embodiment, the suspension structure 104 includes a plurality of support flanges 106 fixed to the structural support, e.g., by welding. The support flanges are arranged so as to define an open socket 110 sized and shaped to receive a complementary cooking surface 200, as best shown in FIGS. 8 and 10. The socket is open in that it is unobstructed by closely-spaced rods typical of conventional grates that could absorb heat from the fuel source that is otherwise used to heat the cooking surface in accordance with the present invention. In the exemplary embodiment, each of the support flanges 106 has a generally L-shaped cross section, but any suitable configuration may be used. The L-shaped configuration, for at least part of each support flange, is preferred in that horizontal leg of the flange is used for vertical support of the cooking surface, and the vertical leg of the flange is used for horizontal/lateral support of the cooking surface, such that the cooking surface is maintained in a well defined position both laterally and vertically.

Notably, the support flanges 106 are arranged to define a socket such that fuel ports 108 are defined along side the socket 110, to permit admission of additional fuel to the fuel chamber while the cooking surface support 100 is in use. In this exemplary embodiment, the support flanges 106 are generally arranged as chords of the circular structural support 102, but any suitable arrangement may be used. In this exemplary embodiment, fuel ports 108 are defined along 3 sides of the socket 110, so as to provide access to substantially all of the fuel chamber, as shown in FIGS. 8, 10 and 11. Further, the tombstone-shaped cooking surface allows for unobstructed access of all three fuel ports 108, on three sides of the grill. Accordingly, the open fuel ports 108 provide open access directly to the fuel chamber at all times throughout the cooking cycle, without the need to remove a fixed grate, and without the need to open hinged sections of a hinged grate. Further the arcuate edge of the cooking surface mates with the base portion of the grill and thus avoids any gaps into which pizza or food could fall.

Figure 9:
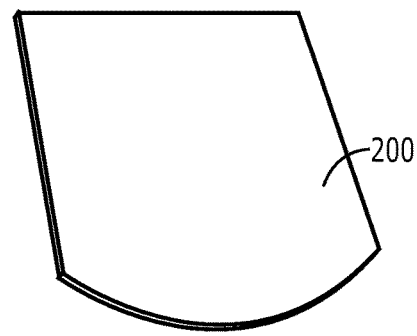
FIG. 9 is a top view of a truncated cooking surface in accordance with an exemplary embodiment of the present invention.
Figure 12:
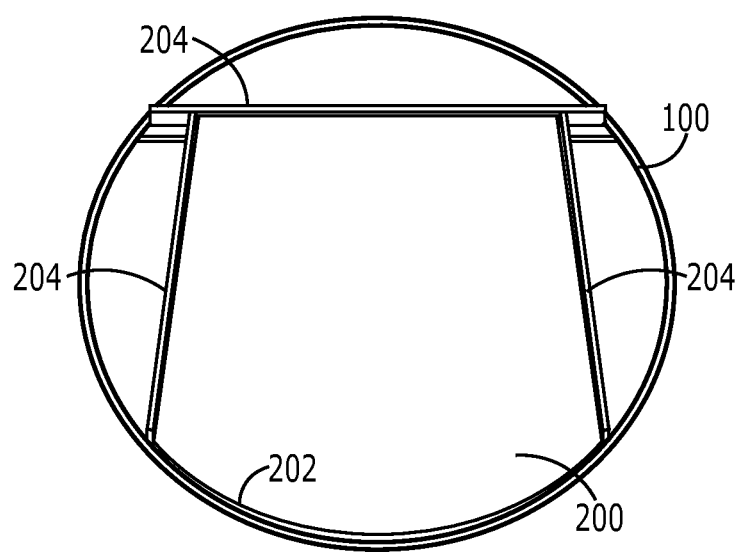
FIG. 12 is a top view of the cooking surface support of FIG. 8 shown supporting the truncated cooking surface of FIG. 9.
Figure 13:
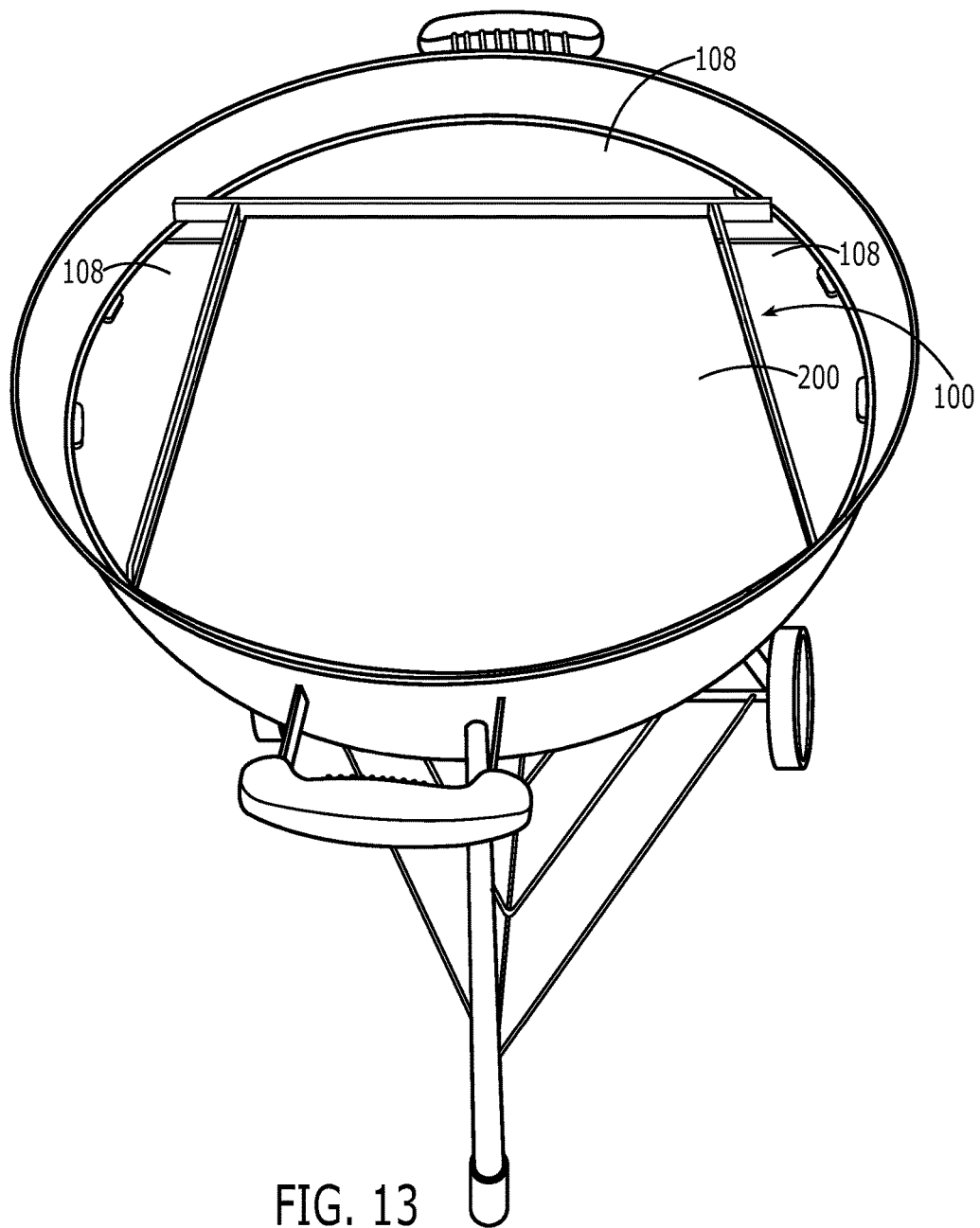
FIG. 13 is a top view of the base portion of the kettle grill of FIG. 11, shown supporting the cooking surface support and truncated cooking surface of FIG. 12.

The apparatus further includes a cooking surface 200 supportable on the cooking surface support 100 in the socket 110, as will be appreciated from FIGS. 9, 12 and 13. The cooking surface 200 can be made of any material that is sufficiently heat-resistant to withstand the maximum temperatures conventionally generated in a pizza oven or grill (it should probably be able to withstand at least 750 degrees Fahrenheit) and sufficiently strong to support any food items likely to be placed thereon. A ceramic material is preferred for the cooking surface, particularly in those embodiments in which the cooking surface is intended for use as a pizza stone, though other materials may be used. Notably, the fuel ports 108 remain fully-accessible to admitting additional fuel to the fuel chamber even after the cooking surface 200 is placed within the socket 110 on the cooking surface support 100, as best shown in FIG. 13.

In a preferred embodiment, the cooking surface 200 is substantially flat and has a continuous surface free of through-openings, much like a conventional pizza stone. The cooking surface 200 is sized and shaped to be received in the socket 110 and to be supported by the cooking surface support 100. The cooking surface 200 is truncated in shape, in that it does not span the entire area of the grill and/or cooking surface support 100, but rather is sized and/or shaped such that its edges, on at least two sides, and preferably on three sides, are spaced from the inside surface of the base portion of the grill, so as to provide and/or so as not to obstruct the fuel ports 108. In a preferred embodiment, the cooking surface 200 is generally tombstone-shaped, in that it includes one arcuate edge 202 for conforming to the circular edge of a circularly-shaped grill, and a plurality of other edges 204 that collectively define a perimeter having a smaller area than a circle sharing that same arcuate edge. In a preferred embodiment, the other edges 204 of the cooking surface are linear and are joined at right angles, as shown in FIG. 12 and in FIGS. 20A-20F, but they need not be linear, and may be otherwise oriented in any suitable shape.

In use, the exemplary embodiment of the apparatus of FIGS. 9-13 and 20A-20F may be used in conjunction with a conventional kettle- or kamado-style grill by removing the cover and conventional grate, if any, providing a fuel supply in the fuel chamber of the grill, mounting the cooking surface support 100 to the grill by placing it on the existing supports 16, and then placing the cooking surface 200 in the socket 110 of the cooking surface support 100, before or after igniting the fuel source. The grill's cover or lid may be fitted in the usual manner. Food, such as an uncooked pizza, may be placed on the cooking surface 200, e.g., after the grill has reached a desired cooking temperature. If during cooking it is necessary or desirable to add fuel to the fuel chamber beneath the cooking surface, additional fuel may be added by admitting fuel to the fuel chamber via the fuel ports 108 positioned adjacent the sides of the cooking surface. Notably, neither the cooking surface 200 nor any food positioned thereon needs to be removed from the grill to re-stoke the fuel chamber. It may be preferably to provide additional fuel via each of the ports 108 to promote even distribution of the fuel and a resulting event distribution of the heat over the cooking surface 200.

Figure 14:
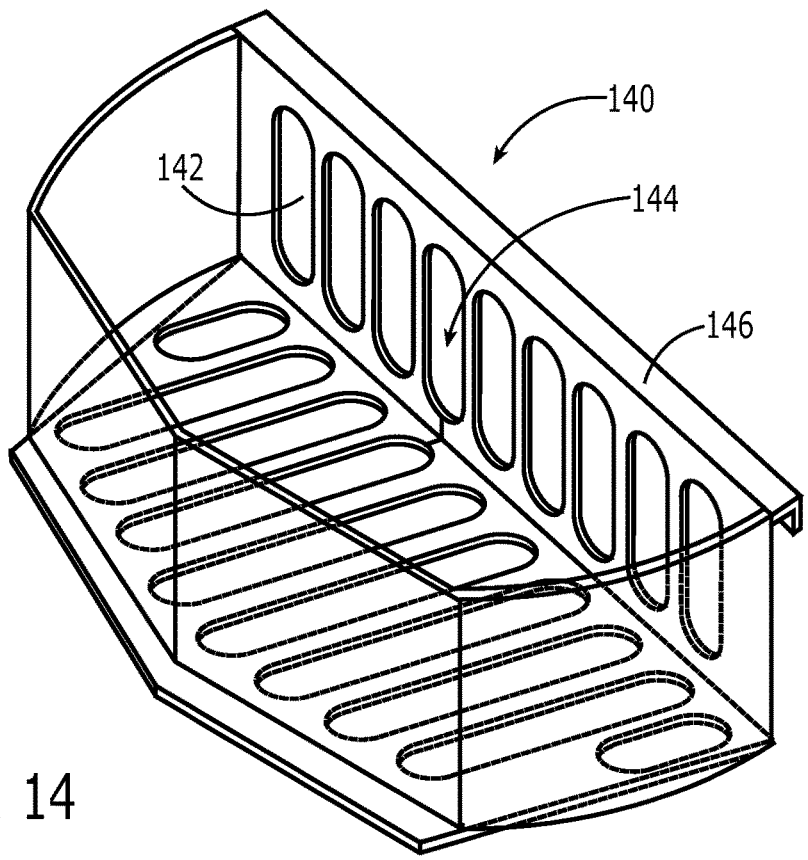
FIG. 14 is a perspective view of a secondary fuel basket.
Figure 15:
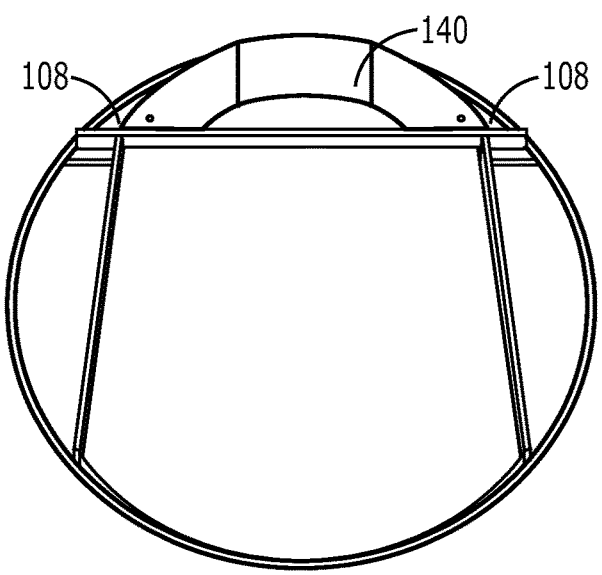
FIG. 15 is a top view of the cooking surface support and truncated cooking surface of FIG. 12 shown supporting the secondary fuel basket of FIG. 14.
Figure 16:
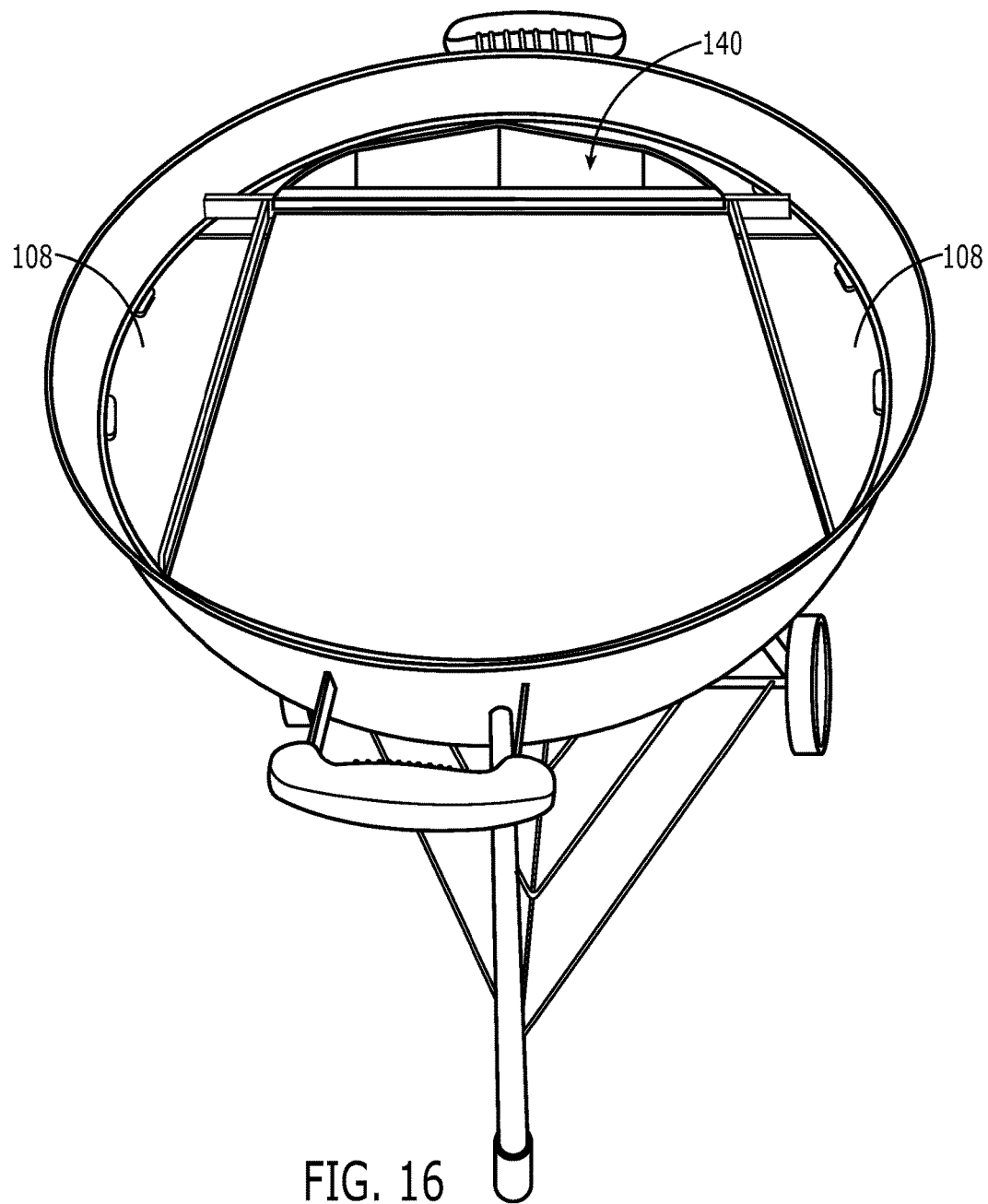
FIG. 16 is a top view of the base portion of the kettle grill of FIG. 11, shown supporting the cooking surface support and truncated cooking surface of FIG. 12, and the secondary fuel basket of FIG. 14.

In a certain embodiment, the apparatus further includes a secondary fuel basket. Such an embodiment is discussed below with reference to FIGS. 14-19. An exemplary secondary fuel basket 140 is shown in FIG. 14. Though used for a different purpose, a basket commercially available as the Char-Basket charcoal briquette holder from Weber-Stephens Products, Inc. is suitable for use as the secondary fuel basket. The basket includes a sidewall 142 and a floor 144 for supporting a supply of fuel in the basket 140, and further includes an attachment member 146 for mounting the basket to the cooking support structure 100. In the exemplary embodiment shown in FIG. 14, the attachment member is provided as flange dimensioned to permit the basket 140 to hang from a support flange 106 of the cooking surface support 100, as best shown in FIGS. 15 and 16. The basket 140 is configured to support a secondary supply of fuel above the primary supply of fuel in the fuel chamber beneath the cooking surface 200, and more particularly, is positioned to be open and to vent heat directly to a space above the cooking surface, without being obstructed by the cooking surface 200. In this manner, heat rising from the basket 140 tends to heat only (or primarily) the air above the cooking surface, and tends to balance the heat distribution above and below the cooking surface 200, and thus promotes temperature uniformity as a function of height above the lower fuel chamber. In a preferred embodiment, the sidewall 142 of the basket 140 is shaped so as not to obstruct the entirety of a fuel port 108 in which it is positioned, so there is an opportunity, even if somewhat limited, to admit fuel through the fuel port 108 despite the presence of the secondary fuel basket therein, as will be best appreciated from FIGS. 15 and 16.

Optionally, certain hardwoods may be employed or added to charcoal in the secondary fuel basket to impart additional flavor to the pizza. Alternatively, such hardwoods or liquid "smoky" flavoring agents may be added to a smoking basket. An exemplary smoking basket 160 is shown in FIG. 21. The smoking basket is similar to the secondary fuel basket in that it a sidewall 162, a floor 164, and an attachment member 166 for mounting the basket to the cooking support structure 100. It is dissimilar from the secondary fuel basket in that the sidewall and floor are joined so that the bottom end is closed. The sidewalls may be free of openings, or may include openings spaced above the floor. In a preferred embodiment, the smoking basket 160 is shaped so as not to obstruct the entirety of a fuel port 108 in which it is positioned, so there is an opportunity, even if somewhat limited, to admit fuel through the fuel port 108 despite the presence of the secondary fuel basket therein.

In use, the exemplary embodiment of the apparatus of FIGS. 14-16 may be used in conjunction with a conventional kettle- or kamado-style grill as described above, and with the additional step of mounting the secondary fuel basket to the cooking surface support 100, and providing and igniting a secondary fuel supply in secondary fuel basket. If during cooking it is necessary or desirable to add fuel to the fuel chamber beneath the cooking surface, additional fuel may be added by admitting fuel to the fuel chamber via the fuel ports 108 positioned adjacent the sides of the cooking surface. Notably, neither the cooking surface 200 nor any food positioned thereon needs to be removed from the grill to re-stoke the fuel chamber. It may be preferably to provide additional fuel via each of the ports 108 to promote even distribution of the fuel and a resulting even distribution of the heat over the cooking surface 200. Similarly, additional fuel may be added through the open top of the secondary fuel basket 140 to promote an even distribution of heat vertically through the cooking chamber, i.e., above and below the cooking surface 200.

Figure 17:
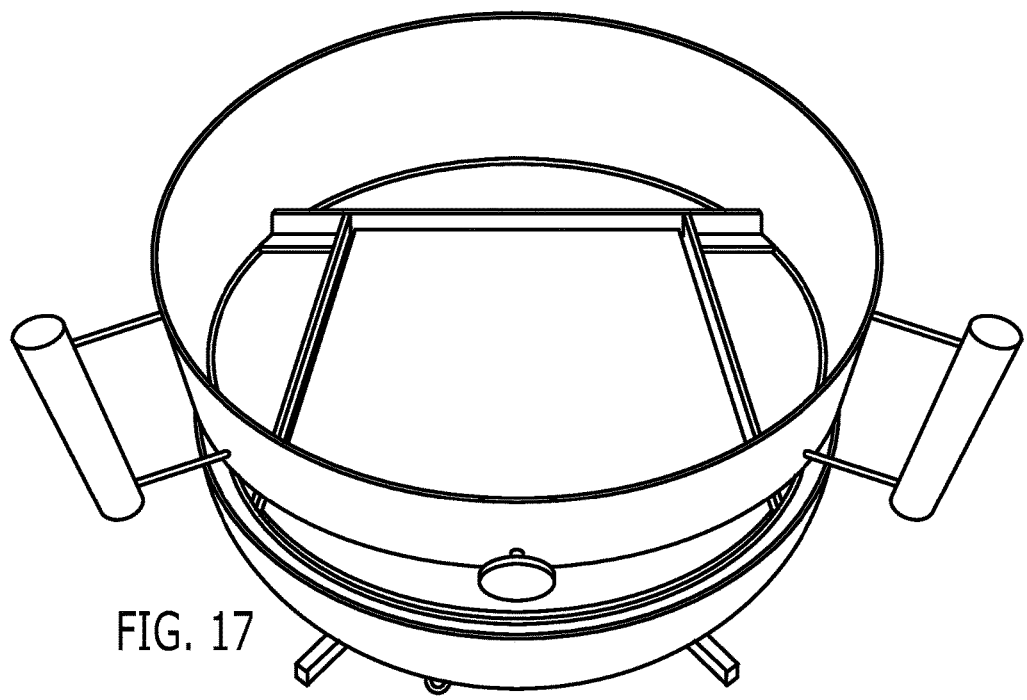
FIGS. 17 and 18 are top views of the base portion of the kettle grill of FIG. 11, shown supporting the cooking surface support and truncated cooking surface of FIG. 12, and in conjunction with a pizza oven insert accessory, shown without and with the secondary fuel basket of FIG. 14, respectively.
Figure 18:
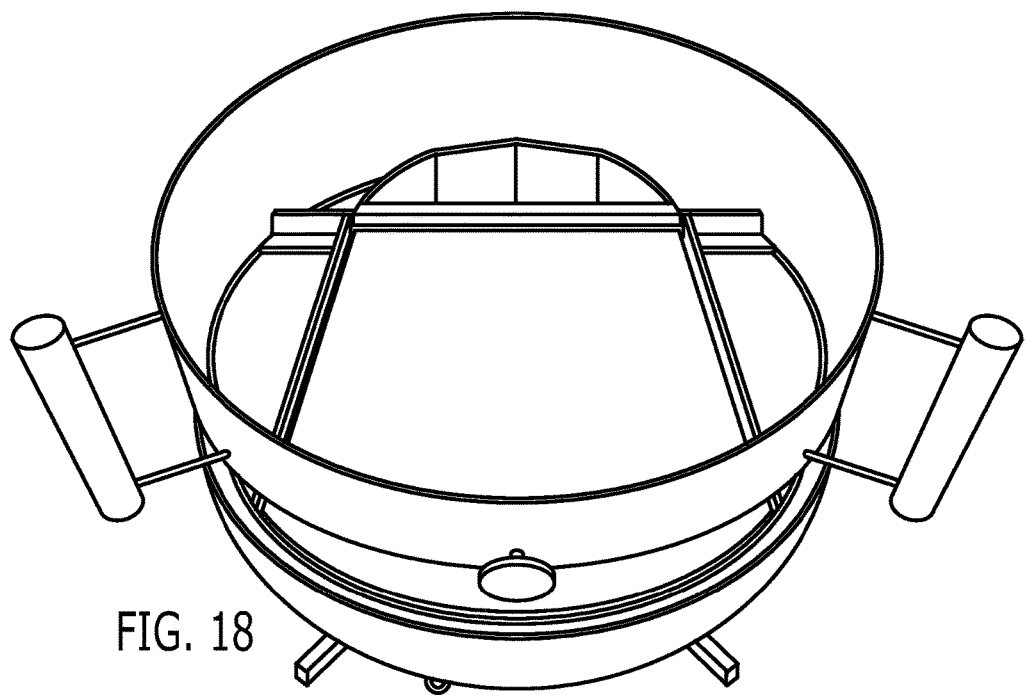
Figure 19:
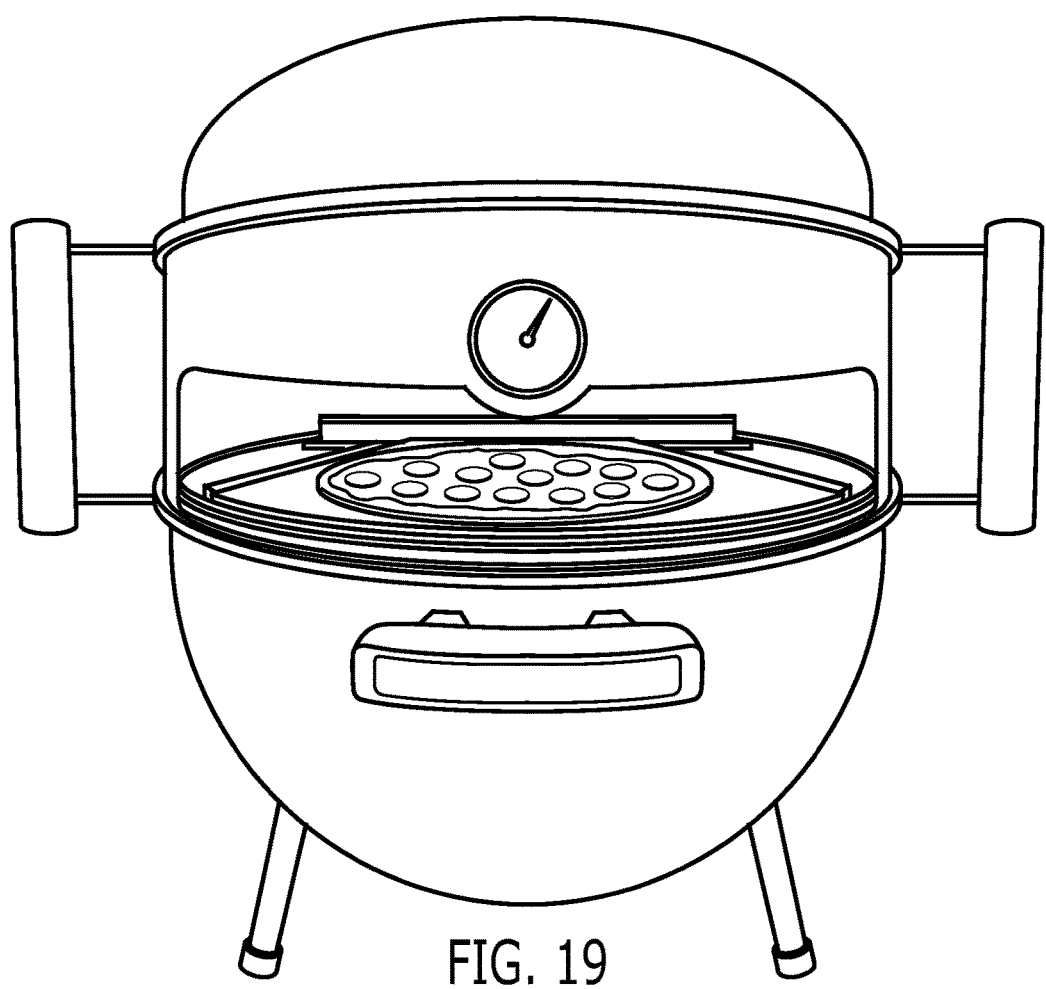
FIG. 19 is a front view of the kettle grill of FIG. 11 shown in conjunction with the pizza oven insert accessory, and shown supporting the cooking surface support and truncated cooking surface of FIG. 12.

It should be noted that the inventor hereof is also the inventor of the subject matter of U.S. application Ser. No. 12/963,140, filed Dec. 8, 2010, and titled Apparatus For Converting Kettle Or Kamado Style Cooking Grills For Cooking Pizza, which is essentially an insert positionable between the base portion and cover of a kettle- or kamado-style grill, as described more fully therein. The apparatus described herein may optionally be used in conjunction with the insert described therein, the entire disclosure of which is hereby incorporated herein by reference. FIG. 17 shows use of the apparatus described herein with such an insert 400, without the use of the secondary fuel basket. FIGS. 18 and 19 show use of the apparatus described herein with such an insert 400, and with the use of the secondary fuel basket 140. It will be noted from FIG. 19 that in such an embodiment, flames rising from the fuel contained in the secondary fuel basket 140 should be readily visible above the cooking surface during normal operation. It will be further noted that in this embodiment, the arcuate edge of the cooking surface mating with the base portion of the grill provides a cooking surface that is continuous to the lateral opening of the insert, which facilitates insertion and removal of foods in a lateral direction through the lateral opening, as best shown in FIG. 19.

The apparatus described herein may be implemented in any number of ways, including, but not limited to (1) as an aftermarket add-on, (2) as a removable feature of an original grill, or (3) as a permanent part of the grill.

While the exemplary embodiment described in detail herein is configured to work with circularly-shaped grills, such as kamado and kettle style grills, this is merely exemplary. The cooking surface support and cooking surface may be otherwise shaped, such as in a rectangle or square. In such an embodiment, the cooking surface may not have an arcuate edge at all, but may still include one edge configured to abut a correspondingly-shaped the inner surface of the grill.

Further, it will be appreciated that the cooking surface need not be ceramic, and need not be a pizza/baking stone. Rather, the cooking surface may be a flat/solid metal skillet/griddle, or may be a grate formed of individual spaced rods, much like a conventional cooking grate, that has an overall shape configured for receipt in the open socket.

FIGS. 22-29 shown an alternative embodiment of an apparatus 300 suitable for use in connection with a kamado- or kettle-style grill 150, as shown in FIG. 11. This apparatus 300 can be used instead of the cooking surface support 100 described above, or instead of the combination of the cooking surface support 100 and cooking surface (e.g. 200) described above. In other words, the apparatus 300 of this embodiment can be used as the cooking surface support in conjunction with a pizza stone or other separate cooking surface, or itself may be used as the cooking surface itself while simultaneously functioning as the cooking surface support.

The apparatus 300 of this embodiment can be made of any material that is sufficiently heat-resistant to withstand the maximum temperatures conventionally generated in a pizza oven or grill (it should probably be able to withstand at least 750 degrees Fahrenheit) and sufficiently strong to support the cooking surface and any food items likely to be placed thereon. Steel or another metal is preferred, though other materials may be used. By way of example, the apparatus 300 may be formed as a unitary body 302 cut or stamped from metal sheet stock. In such an exemplary embodiment, the apparatus may be flat and plate-like.

Like the cooking surface support 100 described above, the apparatus 300 is sized to fit within the base portion 153 of the grill, and preferably to sit directly on the original-equipment supports 16 for the original-equipment grate, as best shown in FIG. 11. Accordingly, the apparatus includes a structural support portion 102 configured to abut the supports 16 for the original-equipment grate. The structural support portion 102 may be simply a periphery of the apparatus 300, which is shown in broken line in FIG. 22 for illustrative purposes.

Notably, the body includes a cooking support portion 304 for supporting either a cooking surface, such as a pizza stone or food itself. The cooking support portion 304 is preferably a major surface spanning more than about 50% of the overall area of the apparatus. In a preferred embodiment, the cooking support portion 304 is substantially flat and has a continuous surface free of through-openings, much like a conventional pizza stone. In a preferred embodiment, the cooking support portion 304 includes an arcuate edge 306 for conforming to the curved inner surface of a grill having a circular cross-section.

The body 304 further defines open fuel ports 108 to permit admission of additional fuel to the fuel chamber while the apparatus 300 is in use. The open fuel ports 108 provide open access directly to the fuel chamber at all times throughout the cooking cycle, without the need to remove a fixed grate, and without the need to open hinged sections of a hinged grate. Further, the edge of the body 304 mates with the base portion of the grill and thus avoids any gaps into which pizza or food could fall. In this exemplary embodiment, the fuel ports 108 are mirror images of one another and they are arranged symmetrically about the body 304. Further, each fuel port 108 is defined to have one edge 108a extending parallel to a peripheral edge of the body.

Figure 22:
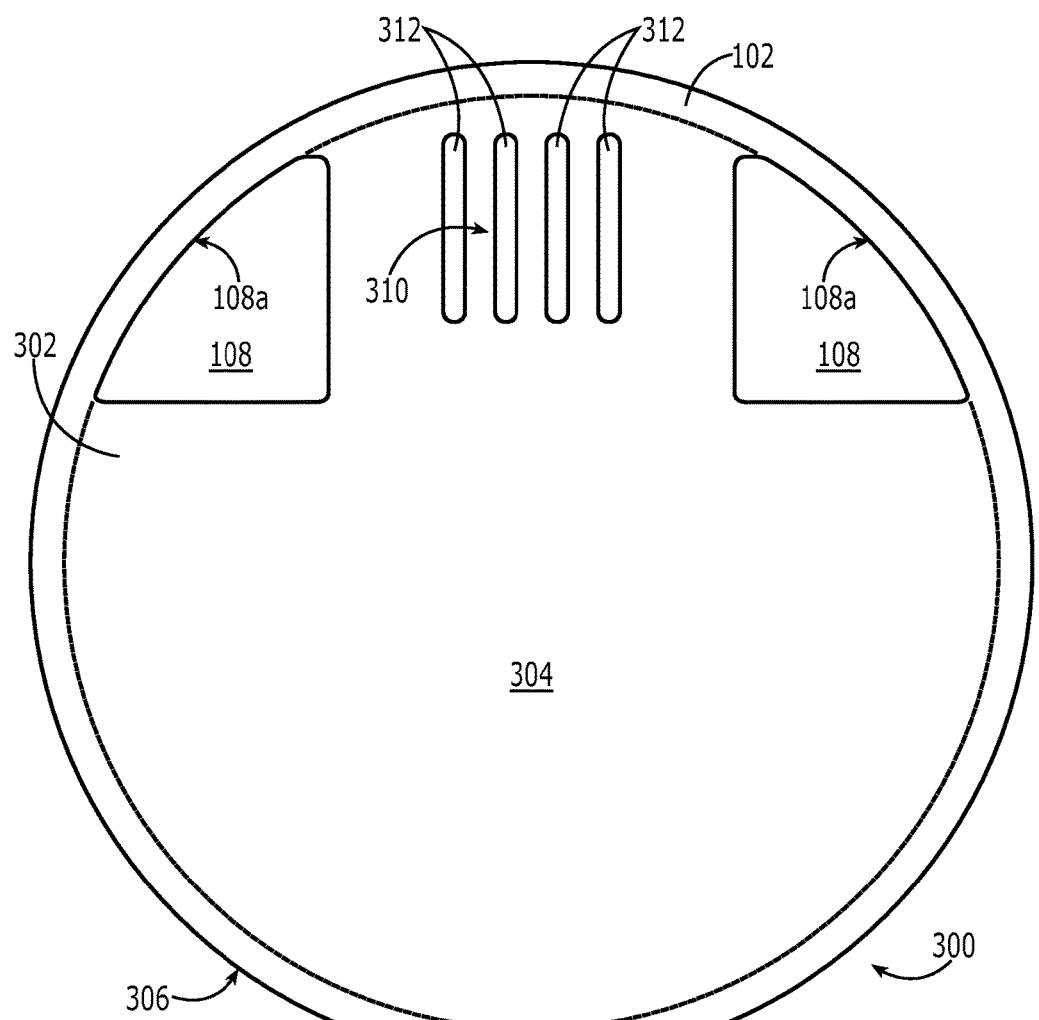
FIG. 22 is a top view of an alternative embodiment of an apparatus including a cooking surface and cooking surface support.
Figure 23:
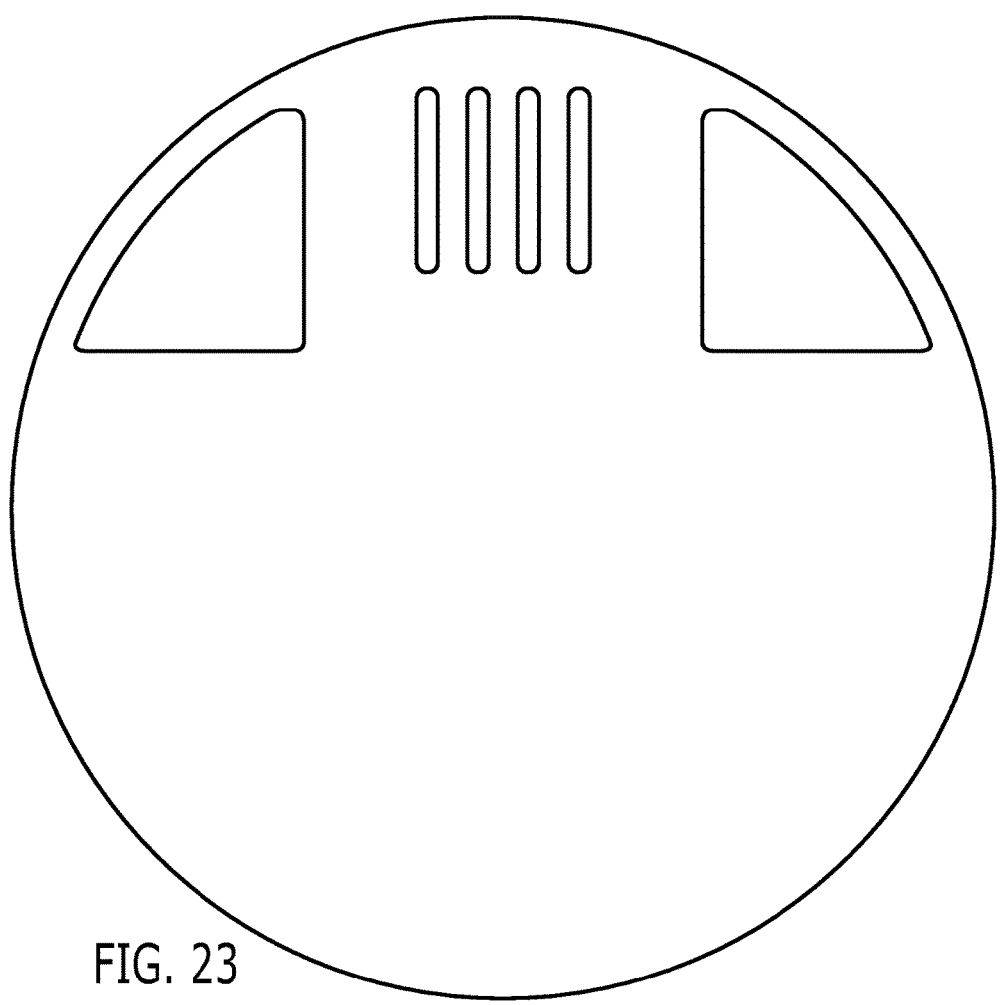
FIG. 23 is a bottom view of the apparatus of FIG. 22.
Figure 24:
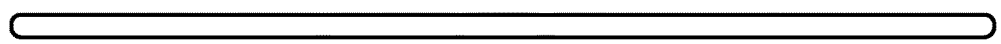
FIGS. 24-27 and front side, back side, left side and right side views, respectively, of the apparatus of FIG. 22.
Figure 25:
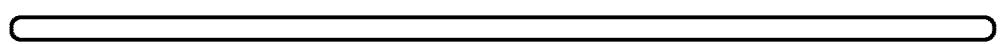
Figure 26:
Figure 27:

In a certain embodiment, the apparatus 300 further includes a secondary fuel zone 310 in which at least one opening is provided. In the exemplary embodiment shown, the secondary fuel zone 310 defines a plurality of openings 312, and the openings are identical in size and shape and are arranged in an equally-spaced array, as best shown in FIG. 22. In other embodiments, different opening configurations may be used. The secondary fuel zone 310 is configured to support a secondary supply of fuel above the primary supply of fuel in the fuel chamber beneath the apparatus 300, and more particularly, in position to vent heat directly to a space above the apparatus 300 or a cooking surface supported thereon, without being obstructed by the apparatus or cooking surface. In this manner, heat rising from the secondary fuel zone 310 tends to heat only (or primarily) the air above the apparatus and/or cooking surface, and tends to balance the heat distribution above and below the apparatus and/or cooking surface. This promotes temperature uniformity as a function of height above the lower fuel chamber. In a preferred embodiment, the secondary fuel zone 310 is positioned between the spaced fuel ports 108. Optionally, certain hardwoods and/or "smoky" flavoring agents may be employed or added to charcoal in the secondary fuel zone 310 to impart additional flavor to the pizza.

In use, the exemplary embodiment of the apparatus of FIGS. 22-27 may be used in conjunction with a conventional kettle- or kamado-style grill by removing the cover and conventional grate, if any, providing a fuel supply in the fuel chamber of the grill, and mounting the apparatus 300 to the grill, e.g., by placing it on the existing supports 16. See FIG. 28. A separate cooking surface, such as a pizza stone, may be placed on the cooking support portion 304 of the apparatus 300 if desired. Food, such as an uncooked pizza, may be placed on the cooking surface, e.g., after the grill has reached a desired cooking temperature. Alternatively, food may be placed and cooked directly on the cooking support portion 304, without use of a separate cooking surface. The grill's cover or lid may be fitted in the usual manner.

If during cooking it is necessary or desirable to add fuel to the fuel chamber beneath the cooking surface, additional fuel may be added by admitting fuel to the fuel chamber via the fuel ports 108. Notably, neither the apparatus 300 nor any food positioned thereon needs to be removed from the grill to re-stoke the fuel chamber. It may be preferably to provide additional fuel via each of the ports 108 to promote even distribution of the fuel and a resulting event distribution of the heat over the cooking surface 200. Secondary fuel and/or hardwoods/flavoring agents may be positioned in the secondary fuel zone 310. Flames and/or heat rising from the lower fuel chamber will cause any combustible material placed in the secondary fuel zone to burn for heating and/or flavoring purposes.

Figure 28:
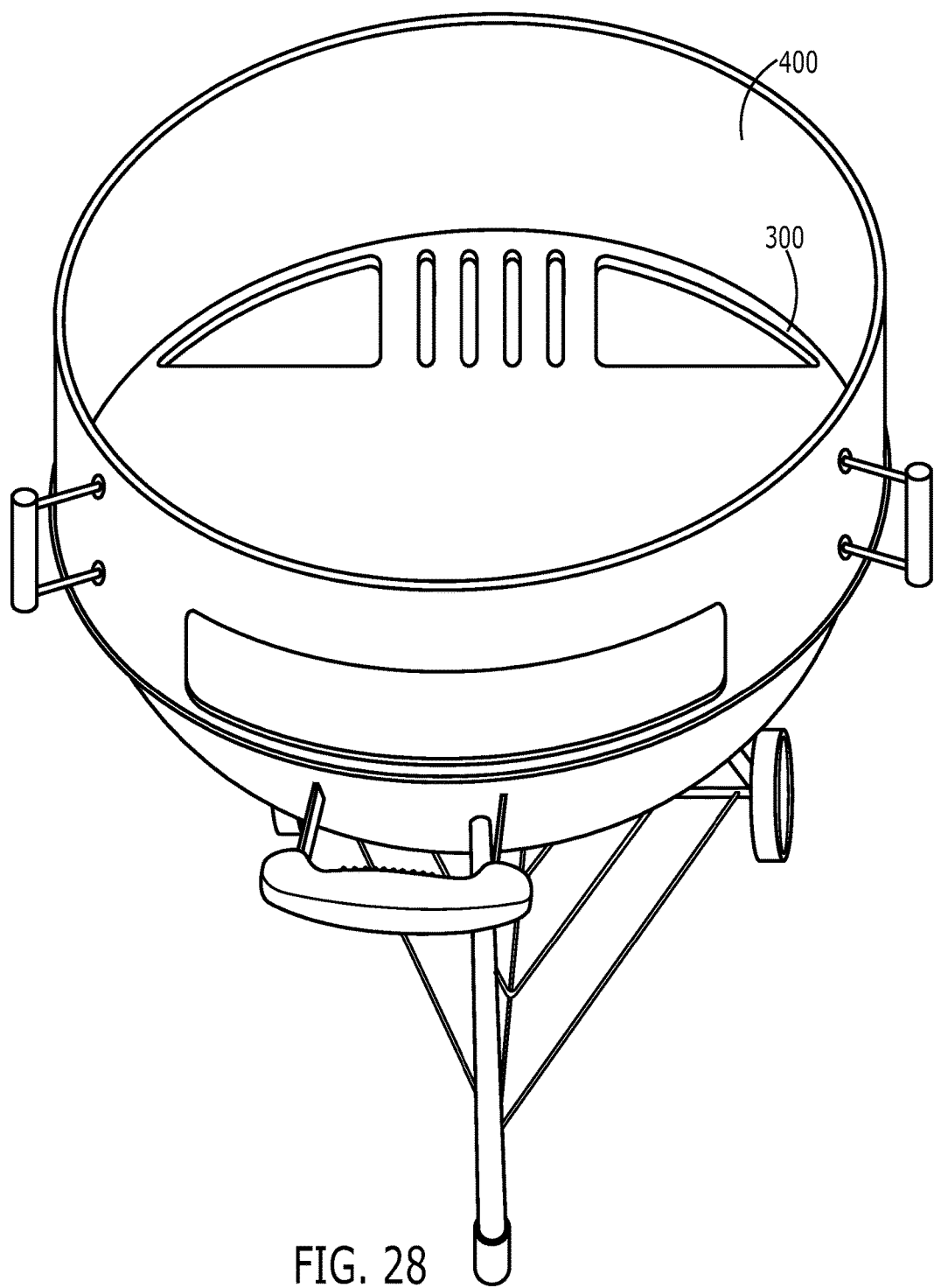
FIG. 28 is a top view of the base portion of the kettle grill of FIG. 11, shown supporting the apparatus of FIG. 22 and a pizza oven insert.
Figure 29:
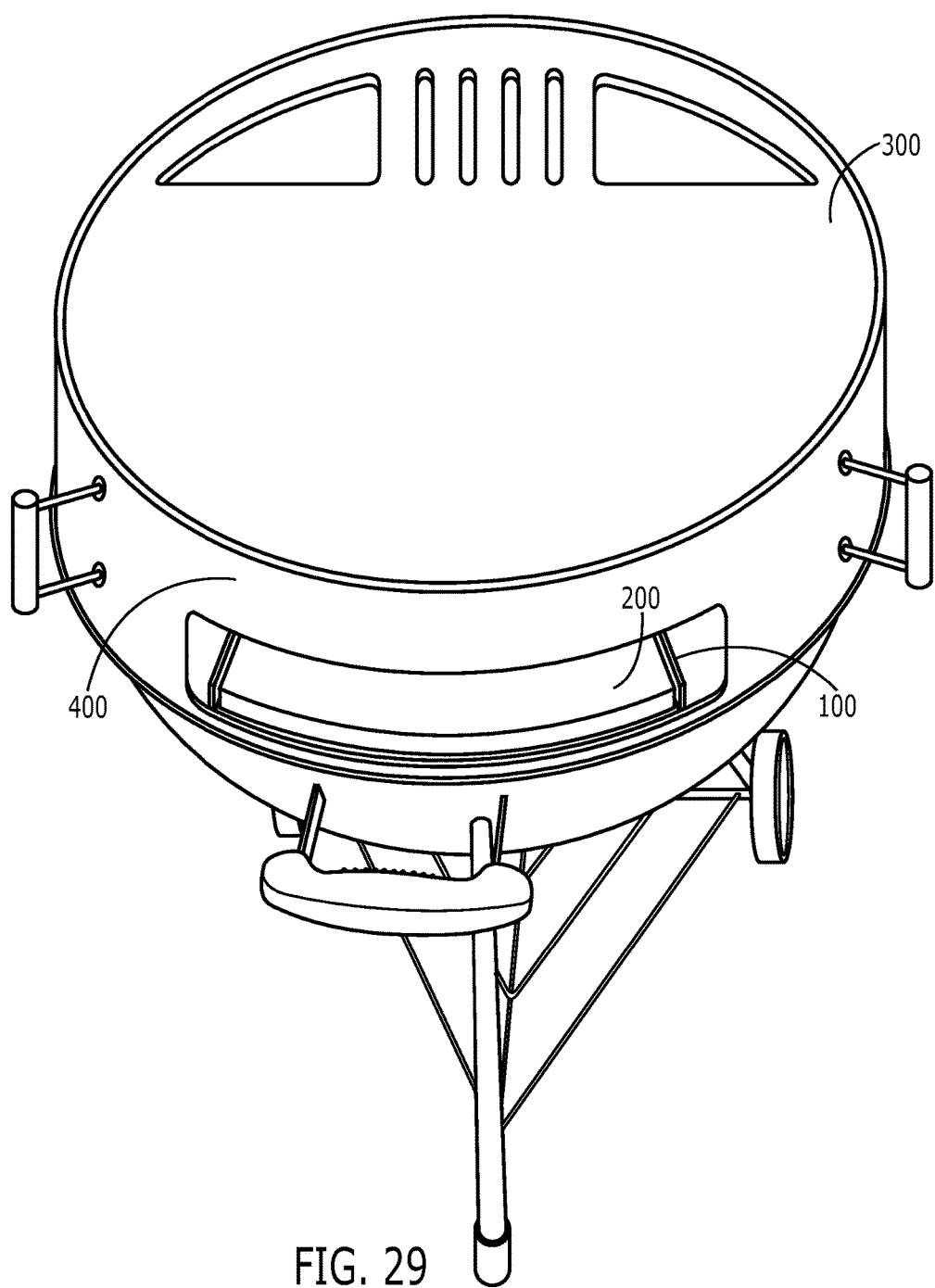
FIG. 29 is a top view of the base portion of the kettle grill of FIG. 11, shown supporting the cooking surface support and truncated cooking surface of FIG. 12, and a pizza oven insert, and the apparatus of FIG. 22.

FIG. 28 further shows a base portion of a grill and an apparatus 300 in conjunction with a pizza oven insert 400. FIG. 29 shows a base portion of a grill and an apparatus 300, in which the apparatus 300 is being used in conjunction with an insert to define a smaller-volume cooking chamber beneath the apparatus 300. In this case, the apparatus 300 is essentially a ceiling of the cooking chamber. The smaller-volume cooking chamber has a smaller volume than the cooking chamber would have if the apparatus were omitted and the convention grill cover were used to define the cooking chamber. In this embodiment, the grill may be used without the cover, or in conjunction with the cover. In FIG. 29, the grill also houses a cooking surface support 100 and cooking surface 200 on which a pizza, etc. could be cooked in a lower position. In FIG. 29, a second pizza could be cooked simultaneously in an upper position on the apparatus 300, when used in conjunction with the grill's cover. Alternatively, a second apparatus 300 could be used in place of the cooking surface support 100 and cooking surface 200 shown in FIG. 29.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:
1. An apparatus for a cooking grill, the cooking grill including matable bottom and top portions that collectively define a substantially enclosed cooking chamber between the top and bottom portions, the bottom portion comprising at least one support structure for supporting a cooking grate, the apparatus comprising:
   a cooking surface; and
   a cooking surface support adapted to be supported in the bottom portion of the cooking grill, the cooking surface support comprising:
      a structural support dimensioned and configured to abut and be supported on the at least one support structure of the bottom portion of the grill in lieu of the cooking grate; and a suspension structure supported on the structural support and configured to mechanically support the cooking surface in the vertical direction, the suspension structure comprising support members configured to define an open socket dimensioned for receiving the cooking surface and for defining a plurality of open fuel ports adjacent the open socket, the open socket being open and unobstructed to provide a direct heat path from a fuel source in the bottom portion of the cooking grill, through the open socket, and to the cooking surface.

2. The apparatus of claim 1, wherein each support member comprises a support flange.

3. The apparatus of claim 2, wherein each support flange has a generally L-shaped cross section, comprising a first leg for supporting the cooking surface in a vertical direction, and a second leg for supporting the cooking surface in a lateral direction transverse to the vertical direction.

4. The apparatus of claim 1, wherein each support member extends in a generally linear direction and is arranged along a chord of a circle that is a cross-section of the bottom portion of the grill.

5. The apparatus of claim 1, wherein the cooking surface is substantially flat and has a continuous surface free of through-openings.

6. The apparatus of claim 5, wherein the cooking surface is tombstone-shaped.

7. The apparatus of claim 1, wherein cooking surface has at least one arcuate edge configured to abut an arcuate portion of the bottom portion of the grill.

8. The apparatus of claim 7, wherein the cooking surface has a plurality of other edges in addition to the arcuate edge, the other edges being positioned so as not to obstruct a corresponding fuel port when the cooking surface is received in the socket.

9. The apparatus of claim 8, wherein each of the other edges is generally linear.

10. The apparatus of claim 9, wherein the plurality of other edges are oriented at right angles to one another.

11. The apparatus of claim 10, wherein the cooking surface is tombstone-shaped.

12. The apparatus of claim 1, wherein the cooking surface is constructed of a ceramic material.

13. The apparatus of claim 1, wherein the cooking surface is truncated in shape.

14. The apparatus of claim 1, further comprising a secondary fuel basket, the secondary fuel basket comprising:
a sidewall;
a floor cooperating with the sidewall for supporting a supply of fuel; and
an attachment member for supporting the secondary fuel basket.

15. The apparatus of claim 14, wherein the attachment member is configured for mounting the secondary fuel basket to the cooking support structure.

16. The apparatus of claim 14, wherein the attachment member comprises a flange dimensioned to permit the secondary fuel basket to hang from the cooking surface support.

17. The apparatus of claim 1, further comprising a smoking basket, the smoking basket comprising:
a sidewall;
a floor cooperating with the sidewall for supporting a supply of smoking agents; and
an attachment member for supporting the smoking basket.

18. The apparatus of claim 17, wherein the attachment member is configured for mounting the smoking basket to the cooking support structure.

19. The apparatus of claim 17, wherein the attachment member comprises a flange dimensioned to permit the smoking basket to hang from the cooking surface support.

20. A cooking grill comprising:
a bottom portion;
a top portion matable with said bottom portion to collectively define a substantially enclosed cooking chamber between the top and bottom portions; and
the apparatus of claim 1.

21. An apparatus for a cooking grill, the cooking grill including matable bottom and top portions that collectively define a substantially enclosed cooking chamber between the top and bottom portions, the bottom portion comprising at least one support structure for supporting a cooking grate, the apparatus comprising:
a cooking surface having a top surface and at least one arcuate edge configured to abut an arcuate portion of the bottom portion of the grill; and
a cooking surface support adapted to be supported in the bottom portion of the cooking grill, the cooking surface support comprising:
a structural support dimensioned and configured to abut and be supported on the at least one support structure of the bottom portion of the grill in lieu of the cooking grate; and
a suspension structure supported on the structural support and configured to support the cooking surface in the vertical direction, the suspension structure comprising support members configured to define an open socket dimensioned for receiving the cooking surface, the support members being configured to support the cooking surface in both the vertical direction and the horizontal direction to maintain the cooking surface in a well-defined position both vertically and laterally with the arcuate edge of the cooking surface abutting the bottom portion of the grill, and with the top surface of the cooking surface disposed above an upper edge of the bottom portion of the grill, the support members further cooperating with the support structure to define a plurality of open fuel ports adjacent the open socket for admitting passage of fuel in the vertical direction through a plane of the open socket.

22. An apparatus for a cooking grill, the cooking grill including matable bottom and top portions that collectively define a substantially enclosed cooking chamber between the top and bottom portions, the bottom portion comprising at least one support structure for supporting a cooking grate, the apparatus comprising:
a cooking surface having at least one side edge; and
a cooking surface support separate from said cooking surface and adapted to be supported in the bottom portion of the cooking grill, the cooking surface support comprising:
a structural support configured to abut the at least one support structure of the bottom portion of the grill, the structural support being formed as a circular hoop to be complementary to the bottom portion of the cooking grill; and
a suspension structure fixed to the structural support and configured to support the cooking surface, the suspension structure comprising support members cooperating to define an open socket for receiving the cooking surface, the support members comprising flanges configured to both support the cooking surface in the vertical direction and abut said at least one side edge of the cooking surface to support the cooking surface in the horizontal direction, the support members further cooperating to define a plurality of open fuel ports, each of the plurality of open fuel portions being positioned adjacent the open socket between at least one support member and the structural support for admitting passage of fuel in the vertical direction through the cooking surface support.

23. The apparatus of claim 22, wherein the cooking surface has an arcuate front edge, a rear edge opposite the front edge, and side edges extended between the front and rear edges, and wherein at least one of said plurality of open fuel ports is defined adjacent of said rear and side edges.

24. The apparatus of claim 22, wherein the cooking surface has at least one arcuate edge configured to abut an arcuate portion of the bottom portion of the grill.

25. The apparatus of claim 23, wherein the cooking surface has a plurality of other edges in addition to the arcuate edge.

26. The apparatus of claim 24, wherein each of the other edges is generally linear.

27. The apparatus of claim 25, wherein the plurality of other edges are oriented at right angles to one another.

28. The apparatus of claim 26, wherein the cooking surface is tombstone-shaped.

* * * * *